United States Patent
Kaufman et al.

(10) Patent No.: US 6,547,397 B1
(45) Date of Patent: Apr. 15, 2003

(54) APPARATUS AND METHOD FOR PROJECTING A 3D IMAGE

(75) Inventors: Steven P. Kaufman, Hooksett, NH (US); Arkady Savikovsky, Needham, MA (US)

(73) Assignee: Laser Projection Technologies, Inc., Londonderry, NH (US)

( * ) Notice: Subject to any disclaimer, the term of this patent is extended or adjusted under 35 U.S.C. 154(b) by 0 days.

(21) Appl. No.: 09/553,235

(22) Filed: Apr. 19, 2000

(51) Int. Cl.⁷ .................. G03B 21/26; G03B 21/00; G02B 26/08; H01S 3/10
(52) U.S. Cl. .................. 353/28; 353/122; 359/196; 359/201; 359/202; 372/24
(58) Field of Search .................. 353/28, 122; 359/201, 359/202, 196, 221; 358/205, 206, 285, 295, 209, 213.11, 302, 208; 372/24; 350/255; 318/127, 128

(56) References Cited

U.S. PATENT DOCUMENTS

| | | | |
|---|---|---|---|
| 3,813,165 A | 5/1974 | Hines et al. ............... 356/5 |
| 3,975,100 A | 8/1976 | Taylor ................... 356/106 R |
| 4,063,819 A | 12/1977 | Hayes ....................... 356/152 |
| 4,396,945 A | 8/1983 | DiMatteo et al. ......... 358/107 |
| 4,436,417 A | 3/1984 | Hutchin ..................... 356/4.5 |
| 4,494,874 A | 1/1985 | DiMatteo et al. ......... 356/376 |
| 4,533,870 A | 8/1985 | Baukol et al. ........... 324/158 D |
| 4,575,625 A | 3/1986 | Knowles ..................... 235/467 |
| 4,650,325 A | 3/1987 | Crowder ..................... 356/152 |
| 4,682,894 A | 7/1987 | Schmidt et al. ............ 356/375 |
| 4,704,020 A | 11/1987 | Murakami et al. .......... 353/122 |
| 4,707,129 A | 11/1987 | Hashimoto et al. ......... 356/4.5 |
| 4,744,664 A | 5/1988 | Offt et al. ................. 356/375 |
| 4,790,651 A | 12/1988 | Brown et al. ............... 356/4.5 |
| 4,797,749 A | 1/1989 | Paulsen ..................... 358/302 |
| 4,813,783 A | 3/1989 | Torge ....................... 356/358 |
| 4,816,920 A | 3/1989 | Paulsen ..................... 358/285 |
| 4,925,308 A | 5/1990 | Stern et al. ................ 356/375 |
| 4,984,898 A | 1/1991 | Hofler et al. .............. 356/358 |
| 5,007,175 A | 4/1991 | Schwarz ..................... 33/286 |

(List continued on next page.)

FOREIGN PATENT DOCUMENTS

| | | | | |
|---|---|---|---|---|
| EP | 0 632 291 A | 1/1995 | .......... G01S/17/06 |
| WO | WO 97 40342 A | 10/1997 | .......... G01C/11/00 |
| WO | WO 99/46614 A | 3/1999 | .......... G01S/17/89 |

*Primary Examiner*—Russell Adams
*Assistant Examiner*—Melissa J Koval
(74) *Attorney, Agent, or Firm*—Peter J. Manus; Edwards & Angell, LLP

(57) ABSTRACT

A laser projector for projecting a 3-D image onto an object. The laser projector has an optics module, a controller module, a power module, and a timing module. The timing module coupled with the optics module measures the distance between the laser projector and the object.

24 Claims, 23 Drawing Sheets

U.S. PATENT DOCUMENTS

| | | | |
|---|---|---|---|
| 5,046,045 A | 9/1991 | Dasher et al. | 364/474.09 |
| 5,048,904 A | 9/1991 | Montagu | 359/202 |
| 5,085,502 A | 2/1992 | Womack et al. | 356/376 |
| 5,127,735 A | 7/1992 | Pitt | 356/358 |
| 5,141,318 A | 8/1992 | Miyazaki et al. | 356/358 |
| 5,146,463 A | 9/1992 | Rando | 372/24 |
| 5,150,249 A | 9/1992 | Montagu | 359/202 |
| 5,237,444 A * | 8/1993 | Schermer | 359/202 |
| 5,341,183 A | 8/1994 | Dorsey-Palmateer | 353/122 |
| 5,381,258 A | 1/1995 | Bordignon et al. | 359/202 |
| 5,388,548 A | 2/1995 | Coudenys et al. | 117/89 |
| 5,400,132 A | 3/1995 | Tregagnier | 356/138 |
| 5,400,143 A | 3/1995 | Bauer | 356/351 |
| 5,430,662 A | 7/1995 | Ahonen | 364/512 |
| 5,444,505 A | 8/1995 | Dorsey-Palmateer | 353/28 |
| 5,450,147 A * | 9/1995 | Dorsey-Palmateer | 353/28 |
| 5,464,976 A | 11/1995 | Scofield et al. | 250/234 |
| 5,506,641 A | 4/1996 | Dorsey-Palmateer | 353/28 |
| 5,530,548 A | 6/1996 | Campbell et al. | 356/375 |
| 5,651,600 A | 7/1997 | Dorsey-Palmateer | 353/122 |
| 5,661,667 A | 8/1997 | Rueb et al. | 364/525 |
| 5,663,795 A | 9/1997 | Rueb | 356/375 |
| 5,757,500 A | 5/1998 | Rueb | 356/375 |
| 5,889,582 A | 3/1999 | Wong et al. | 356/4.01 |
| 5,932,860 A | 8/1999 | Plesko | 235/454 |
| 5,940,180 A | 8/1999 | Ostby | 356/358 |
| 5,949,531 A | 9/1999 | Ehbets et al. | 356/5.01 |
| 6,000,801 A * | 12/1999 | Dillon et al. | 353/28 |

* cited by examiner

APPARATUS AND METHOD FOR PROJECTING A 3D IMAGE

BACKGROUND OF THE INVENTION

1. Field of the Invention

The present invention relates generally to 3D imaging using a laser projector. Particularly, the present invention relates to a rapidly scanned laser system that accurately identifies locations on an object. More particularly, the present invention relates to a rapidly scanning laser system utilizing a three-dimensional data set projected onto contoured surfaces. Even more particularly, the present invention relates to a rapidly scanning laser system utilizing a three-dimensional data set projected onto contoured surfaces that incorporates a laser range-finding system for accurately determining the distance to the contoured surfaces.

2. Description of the Prior Art

Laser projectors are used to project images onto surfaces. They are utilized to assist in the positioning of work pieces on work surfaces. More recent systems have been designed to project three-dimensional images onto contoured surfaces rather than flat surfaces. The projected images are used as patterns for manufacturing products and to scan an image of the desired location of a ply on previously placed plies. Examples of such uses are in the manufacturing of leather products, roof trusses, airplane fuselages and the like. Laser projectors are also used for locating templates or paint masks during the painting of aircraft. A rapidly scanning laser system is a laser spot that moves from location to location with sufficient speed to appear as a continuous line.

The use of a scanned laser image to provide an indication of where to place work piece parts requires extreme accuracy in calibrating the position of the laser projector relative to the work surface. In the past, the systems have typically required the placement of several reference points fixed on or about the work surface. Typically, six reference points were required for sufficient accuracy. Reflectors or sensors have typically been placed in an approximate area where the ply will be placed. Since the points are at fixed locations relative to the work and the laser, the laser also knows where it is relative to the work. The requirement of six fixed reference points has been somewhat restricting in systems used for airplane fuselages. The plies and jobs utilized to attach the plies onto the airplane fuselage are very large. The reference points must be placed at locations where the plies will not cover the reference points. The use of the fixed points has thus been somewhat difficult to achieve. Furthermore, technicians are required to travel to the workplace and accurately place the fixed reference points.

To use a laser-pointing device in a high-accuracy, high-precision application, it must be positioned very accurately over a work piece or tool if it is to illuminate points on the work piece accurately. In one known technique called resectioning, a designator automatically determines its position and orientation relative to a tool by measuring the angles to three or more fiducial points on the tool. A designator is a device similar in concept to a laser light projector, but operating at a higher precision. It is used to sweep a laser beam over a surface to illuminate a curve. A fiducial point is an optical device whose position is accurately known in three dimensions. The tool is brought roughly into position with respect to the designator, for instance to within six inches. The designator, or other external optical devices, are used to sense the fiducial points (a minimum of four), and to measure the angles from the designator to them, not the distance from the designator to the tool. This is done to accurately orient the spatial and angular position of the designator with respect to the tool.

However, the designator cannot designate points accurately if the beam deflection angles cannot be controlled accurately. Resectioning also cannot be accurate if the galvanometers cannot accurately measure spatial angles to the fiducial points. One problem is that the components of the designator are subject to a number of sources of imprecision. These include non-linearities in the galvanometer response and the position detectors, differences in gain in op-amps driving the galvanometers, bearing run-out, tolerance in the mounting of galvanometers in the designator, twist or wobble in the galvanometer shafts, mirrors mounted slightly off axis, variations in mounting of the laser or other beam-steering elements, etc.

U.S. Pat. No. 5,400,132 (1995, Pierre Trepagnier) discloses an improved method of compensating for errors in a laser pointing device, especially in three-dimensional applications, by accurately controlling the angle that the laser beam makes in space. This is called rectification. In the method, the laser-pointing device is established in an accurate angular relationship to at least four fiducial points. The angular errors internal of the designator are determined by comparing actual galvanometer inputs, assuming no error in the established angular relationship. The actual galvanometer inputs are those that aim the laser beam at the fiducial points while recognizing the existence of the internal errors. The nominal galvanometer inputs are those that would aim the laser beam at the fiducial points assuming no internal errors in the laser pointing device. The angular errors are stored in a form for use during scanning by the laser pointing device to compensate for the internal errors in converting nominal direction numbers computed by a control to actual galvanometer inputs. A major drawback of this system is that a minimum of four fiducial points is required, but preferably six points, to properly project the image, or the distance to the points must be accurately known.

More recently, there has been disclosed a system in which reference points can be placed at initially unknown locations about a workplace. However, the laser is able to determine the specific location of the unknown locations of the reference points provided that at least one variable is fixed. U.S. Pat. No. 5,757,500 (1998, Kurt Rueb) discloses a system that utilizes two reference points which are spaced by a fixed distance. The system is able to calibrate its location in space and relative to the work piece by determining the angular location of the unknown locations for the reference points. The known distance between the two reference points is then relied upon to fix the location of all reference points in space and the location of the laser projector.

In all of the prior art devices, one variable must be fixed. In some, it is required that the distance between the laser projector and the work piece platform be known and fixed. This represents the "z" axis in a three-dimension (x-y-z) system. Not knowing the distance between the laser projector and the work piece requires these prior art systems to triangulate a plurality, usually at least six, of known reference points to correctly projecting the laser image upon the work piece. In other systems, it is required that the distance between two reference points on the work piece platform be known and fixed.

In addition, all prior art devices require that the tool or object onto which an optical template is to be projected requires the object or tool to contain reference data marks. These reference data marks are based on ship set coordinates and are located using theodolites or laser tracker. A theodolite is extremely expensive piece of equipment, approximately $250,000. They are capable of five-decimal point accuracy in determining the coordinates of the reference marks. For painting template applications, 5-decimal point accuracy is unwarranted. Thus the cost of buying a theodolite cannot be justified.

Therefore what is needed is a 3D imaging system utilizing a three-dimensional data set projected onto contoured surfaces where the distance between the laser projector and the work piece platform does not need to be known. What is further needed is a 3D imaging system utilizing a three-dimensional data set projected onto contoured surfaces that can determine the distance between the laser projector of the system and the surface. What is still further needed is a 3D imaging system that can measure the distance between the laser projector and the surface, and use the distance value to properly project a laser template onto a work piece. What is yet further needed is a 3D imaging system that is sufficiently accurate for applications not requiring 5-decimal accuracy, is easy to use, and is relatively inexpensive.

SUMMARY OF THE INVENTION

It is an object of the present invention to provide a 3D imaging system utilizing a three-dimensional data set projected onto contoured surfaces where the distance between the laser projector and the work piece platform does not need to be known. It is a further object of the present invention to provide a 3D imaging system utilizing a three-dimensional data set projected onto contoured surfaces that can determine the distance between the laser projector of the system and the surface. It is another object of the present invention to provide a 3D imaging system that can accurately measure the distance between the laser projector and three reference sensors and use the distance value to properly project a laser template onto a work piece. It is still another object of the present invention to provide a 3D imaging system that is sufficiently accurate for applications that do not require 5-decimal point accuracy, is easy to use, and is relatively inexpensive.

The present invention achieves these and other objectives by providing a 3D imaging system that can accurately determine the three-dimensional location of a given surface without knowing the distance between the 3D imaging system and the surface of a work piece . The 3D imaging system of the present invention combines a laser projector and a laser range finder into one system head for accurately determining the distance between the laser projector and a work surface and to accurately project a laser template onto the work surface.

The 3D imaging system includes a laser light emitting component, a motorized focusing assembly for focusing the beam of the laser light at some distance from the 3D imaging system, a two-axis beam steering mechanism to rapidly direct the laser light over a defined surface area, a photo optic feedback component, a timing device, a controller module, a data storage device, an input power module, one or more output DC power modules, and an imaging system cooling subsystem. The laser light emitting component produces a visible laser light and may include a prism to optically correct astigmatism as well as one or more lenses that work as a beam collimator. The motorized focusing assembly, which receives the laser beam, has a focusing lens mounted to a linear actuator. The linear actuator is mechanically attached to a DC motor, which is controlled by a motor controller. The focusing assembly also includes travel limit sensors that are mounted at the ends of the travel of the focus assembly. The travel limit sensors as well as the motor controller are connected to the controller module.

The two-axis beam steering mechanism has two reflective optical elements, each mounted on its own coupling shaft. Each of the optical element coupling shafts is connected to the output of separate galvanometer servomotors. The two galvanometer servomotors are mounted in such a way as to provide a three-dimensional beam output profile. The beam profile that is produced is in the shape of an inverted pyramid with concave sides that expands at the base as the distance from the imaging system increases.

The photo optic feedback component includes a photo optic sensor, a band pass light filter and an adjustable reflective element. The photo optic sensor and band pass filter are mounted orthogonal to the return light path of the laser beam. The adjustable reflective element is mounted so as to direct a portion of the return beam of laser light to the photo optic sensor. A timing device, which includes a high-speed chronometer, is coupled to the optic feedback system to provide a distance ranging system that allows for measuring the distance between the imaging system and a retro-reflective surface. The distance measurement is accomplished by measuring the time of flight of the laser light from the time that a pulse is emitted from the 3D imaging system to the time that the return pulse is received at the photo optic sensor.

The controller module is the brain of the image system. It contains a microprocessor that controls the operation of the imaging system in response to various parameter inputs to properly project a 3D image onto a work piece. Typically, the controller module is a single-board computer that processes specific software commands.

The data storage device, which is coupled to the controller module, may contain the operating system platform software, the administrator application software, the operator application software, the laser database, the laser parameter sets database, a template image tool database, a parts database, and a jobs database. In a single head, stand-alone unit all of the software may reside on the data storage device of the imaging system. For example, by coupling infrared data transfer electronics in a keyboard and an infrared receiver to the imaging system head, a complete stand-alone unit without hardwire connection between the keyboard and the imaging system is possible. Some of the software may also reside on a separate, stand-alone computer connected to the imaging system head.

It is also possible to network multiple imaging heads into a system that allows coverage of relatively large work pieces. The use of multiple imaging heads also allows for better aspect ratio of a 3D work piece, i.e. covers work piece contours more efficiently. In a multi-head system, the controller module on one of the heads is configured as the master and the remaining heads are configured as slaves. Each head is connected to a hub using 10-base T Ethernet connection. The hub is typically connected to a server. In a multi-head system, the administrator and operator application software may be stored on the server, on a workstation, or some combination of the server, workstation and imaging head.

The method used by the present invention is unlike prior art devices. Prior art devices required that the 3D reference sensors must be in a known relationship to the 3D data set to be projected. Further, at least four reference points, and preferably six reference points are required for practical application. This is so because estimates for the x-y-z variables of the projector position and the q-r-s variables of the angular orientation of the projector are used in a Taylor series expansion and a least squares analysis iterates to improve the solution. The present invention determines the distance between the projector and the sensors using its internal range finding system. The 3D reference sensors' x-y-z positions are calculated. A computer algorithm uses the calculated x-y-z positions of the 3D reference sensors to calculate the projector position. Because the distance between the projector and the sensors can be accurately determined, only three reference sensors are required to accurately project the template data set onto a work piece.

All of the advantages of the present invention will be clear upon review of the detailed description, drawings and appended claims.

DETAILED DESCRIPTION OF THE PREFERRED EMBODIMENT

Figure 1:
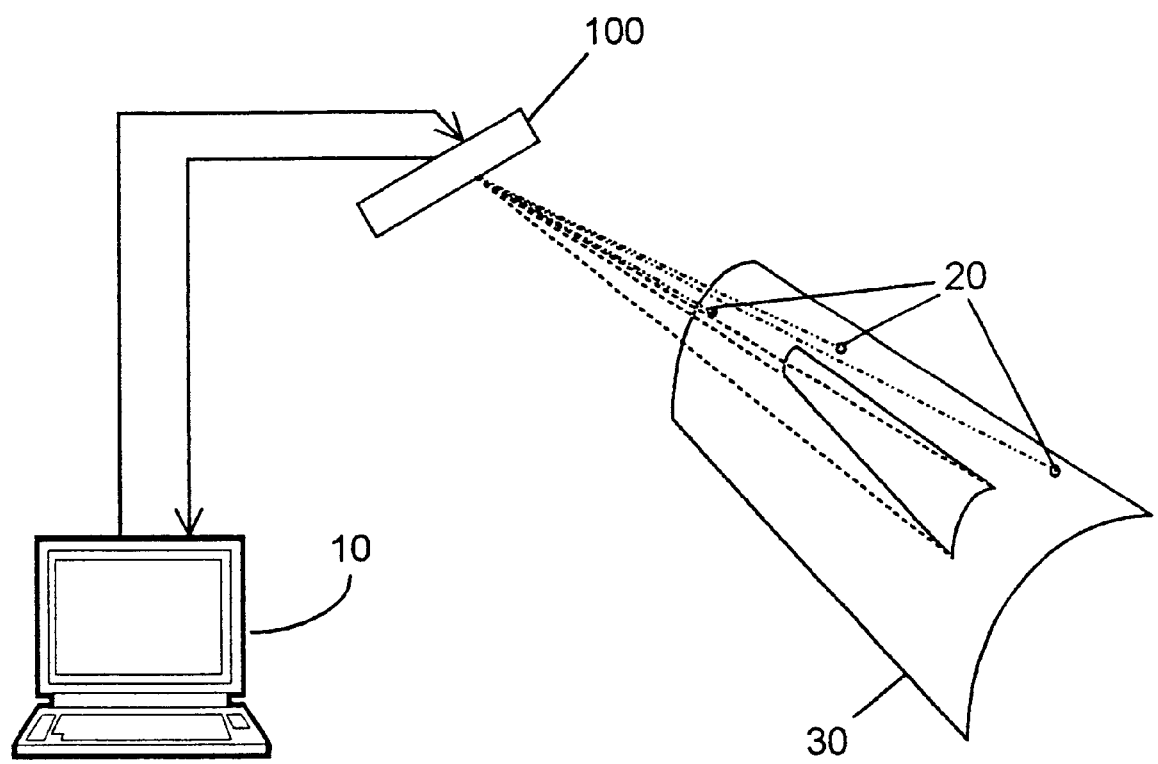
FIG. 1 is a perspective view of the present invention showing a laser projector projecting a template onto an object.

The preferred embodiment of the present invention is illustrated in FIGS. 1–23. FIG. 1 shows operator interface 10, projector 100 having the data set defining the pattern to project and reference sensors 20 positioned on the object 30. The present invention addresses the inadequacies in projection systems where the reference sensors 20 must be in a known relationship to the 3-D data set to be projected. The present invention uses an integrated laser range-finding system to accurately determine the x-y-z positions of reference sensors 20.

Figure 2:
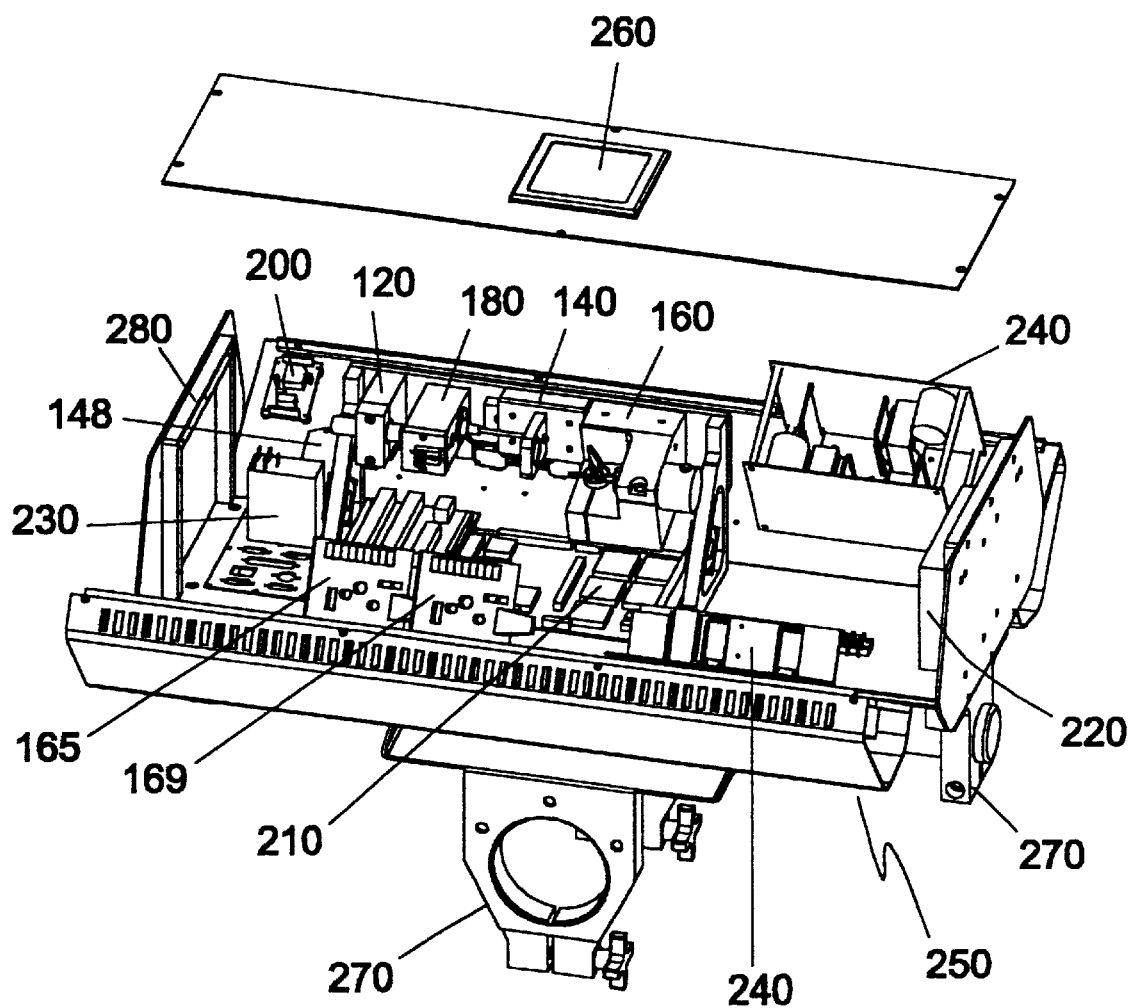
FIG. 2 is an exploded view of one embodiment of the present invention showing various components of the laser projector.

FIG. 2 shows an internal view of projector 100. Projector 100 has an optics module 110 that contains a laser light emitting component 120, a motorized focusing assembly 140 for focusing the beam of the laser light at some distance from the 3D imaging system, a two-axis beam steering mechanism 160 to rapidly direct the laser light over a defined surface area, and a photo optic feedback component 180. Projector 100 also includes a timing device 200, a controller module 210, a data storage device 220, an input power module 230, one or more output DC power modules 240, an imaging system cooling subsystem 250, and a laser light output window 260. Projector 100 also has an electrically conductive foam and metal-type gasket 280 to provide a dust tight seal from the external environment. Projector 100 is also equipped with an external mounting system 270 that provides two degrees of freedom of adjustment in both tip and tilt about a fixed post.

Figure 3:
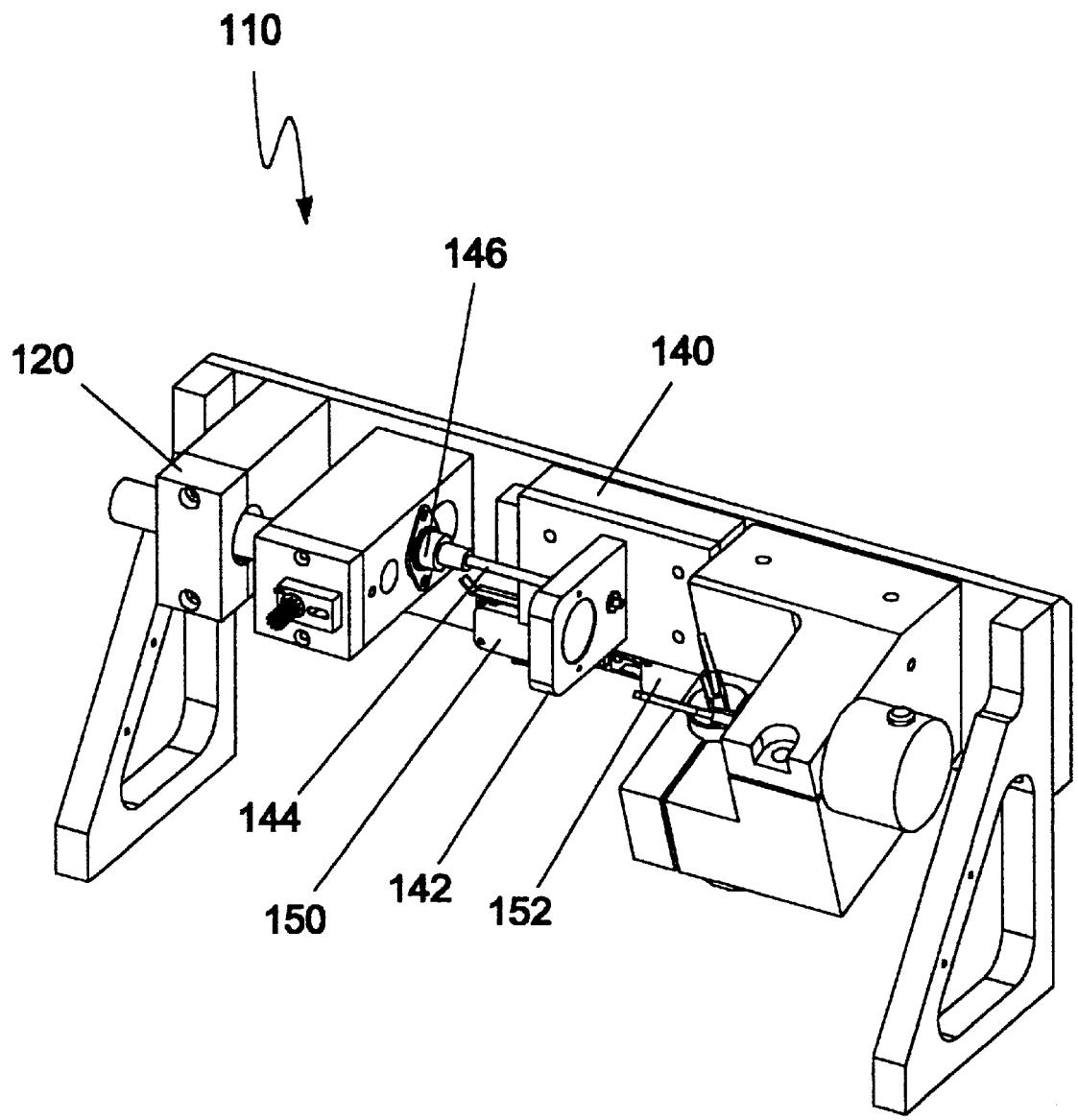
FIG. 3 is an enlarged view of the optics module of the present invention showing the various optics components.

Turning now to FIG. 3, laser light emitting component 120 of optics module 110 produces a visible laser light and may include a prism to optically correct astigmatism as well as one or more lenses that work as a beam collimator. Motorized focusing assembly 140, which receives the laser beam, has a focusing lens 142 mounted to a linear actuator 144. Linear actuator 144 is mechanically attached to a DC motor 146, which is controlled by motor controller 148 shown in FIG. 2. Focusing assembly 140 also includes travel limit sensors 160 and 152 that are mounted at the ends of the travel of the focus assembly 140. Travel limit sensors 150 and 152 as well as motor controller 148 are connected to the controller module 210.

Figure 4:
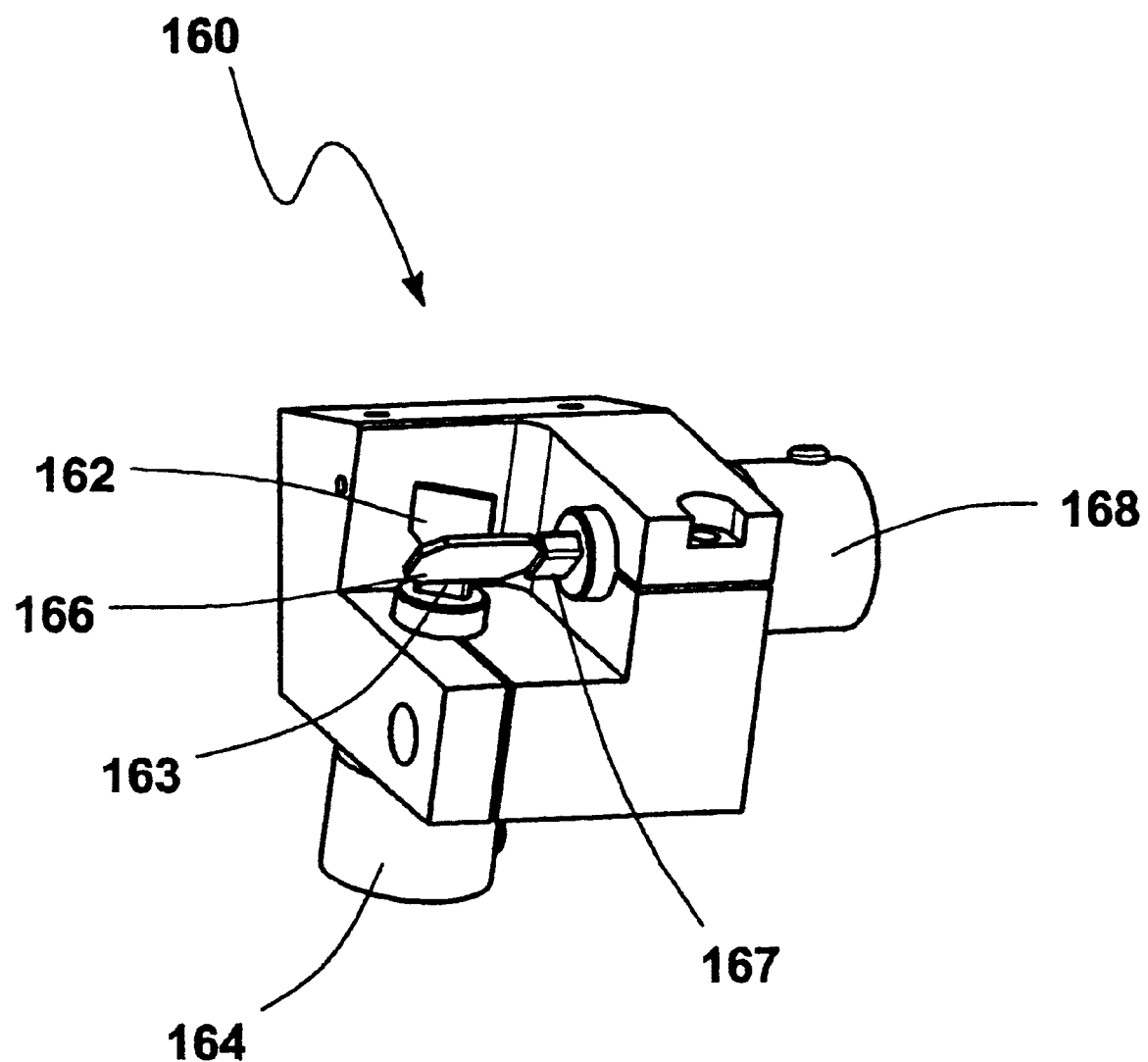
FIG. 4 is an enlarged view of the two-axis beam steering mechanism of the optics module of the present invention.

Two-axis beam steering mechanism 160, as illustrated in FIG. 4, has two reflective optical elements 162 and 166 mounted on coupling shafts 163 and 167, respectively. Coupling shafts 163 and 167 are connected to the output of separate galvanometer servomotors 164 and 168, respectively. The two galvanometer servo motors 164 and 168 are mounted in such a way as to provide a three-dimensional beam output profile. Servo motors 164 and 168 require an electronic servo driver and a sixteen bit digital-to-analog input converter 165 and 169, as illustrated in FIG. 2. The beam profile that is produced is in the shape of an inverted pyramid with concave sides that expands at the base as the distance from the imaging system increases.

Figure 5:
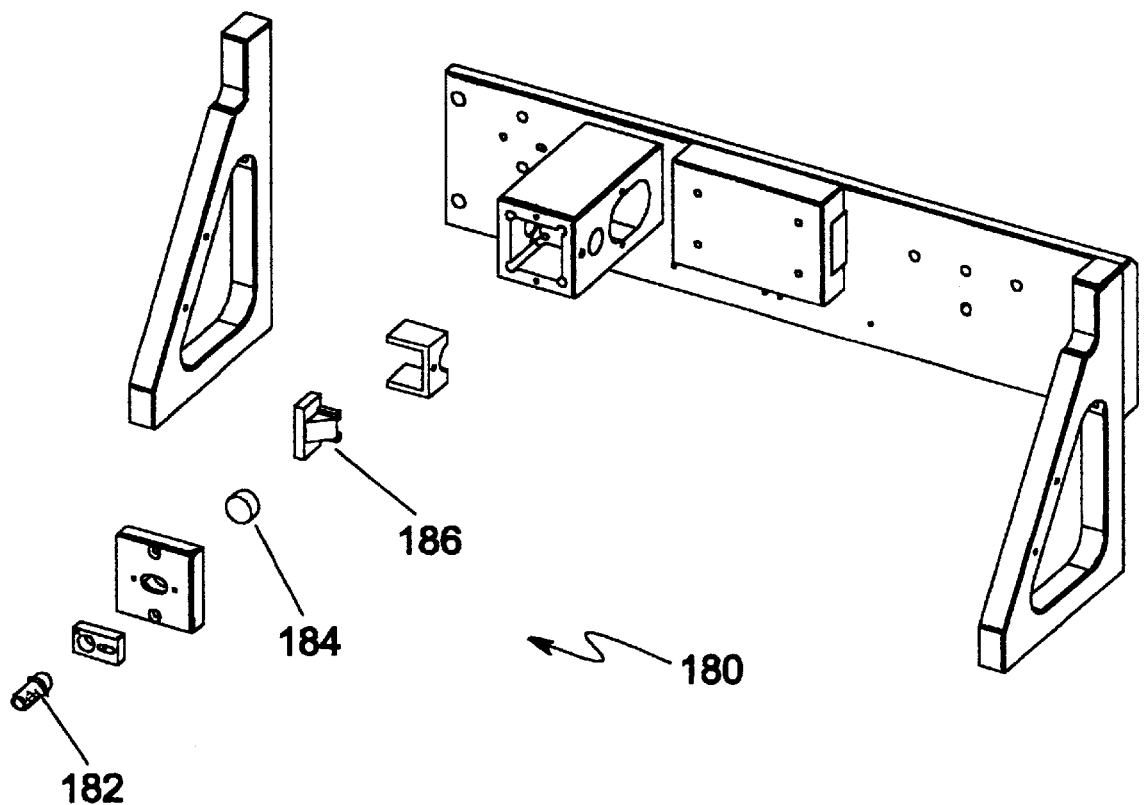
FIG. 5 is an exploded view of the photo optics sensor of the optics module of the present invention.

Turning now to FIG. 5, photo optic feedback component 180 includes a photo optic sensor 182, a band pass light filter 184 and an adjustable reflective element 186. Photo optic sensor 182 and band pass filter 184 are mounted orthogonal to the return light path of the laser beam. Adjustable reflective element 184 is mounted so as to direct a portion of the return beam of laser light to photo optic sensor 182.

As illustrated in FIG. 2, timing device 200, which is a high-speed chronometer, is coupled to optic feedback component 180 to provide a distance ranging system that allows for measuring the distance between projector 100 and a surface. The distance measurement is accomplished by measuring the time of flight of the laser light from the time that a pulse is emitted from the 3D imaging system to the time that the return pulse is received at photo optic sensor 182. The high-speed chronometer has an accuracy of 2 picoseconds. The high-speed chronometer gives the range-finding system an accuracy of 0.006 inch at 30 feet.

The controller module 210 is the brain of projector 100. Controller module 210 contains a microprocessor that controls the operation of projector 100 in response to various parameter inputs to properly project a 3D image onto a work piece 20. Typically, controller module 210 is a single-board computer that processes specific software commands. An example of a useable single-board computer is available from WinSystems, Arlington, Tex. (Cat. No. LBC-586Plus).

Data storage device 220, which is coupled to controller module 210, may contain the operating system platform software, the administrator application software, the operator application software, and various databases. Data storage device 220 may be any commercially available computer hard drive having sufficient storage capacity to hold the software, the various databases, and data sets. In a single head, stand-alone unit all of the software may reside on the data storage device of the imaging system. For example, by coupling infrared data transfer electronics in a keyboard and an infrared receiver to the imaging system head, a complete stand-alone unit without hardwire connection between the keyboard and the imaging system is possible. Some of the software may also reside on a separate, stand-alone computer connected to the imaging system head.

Figure 6:
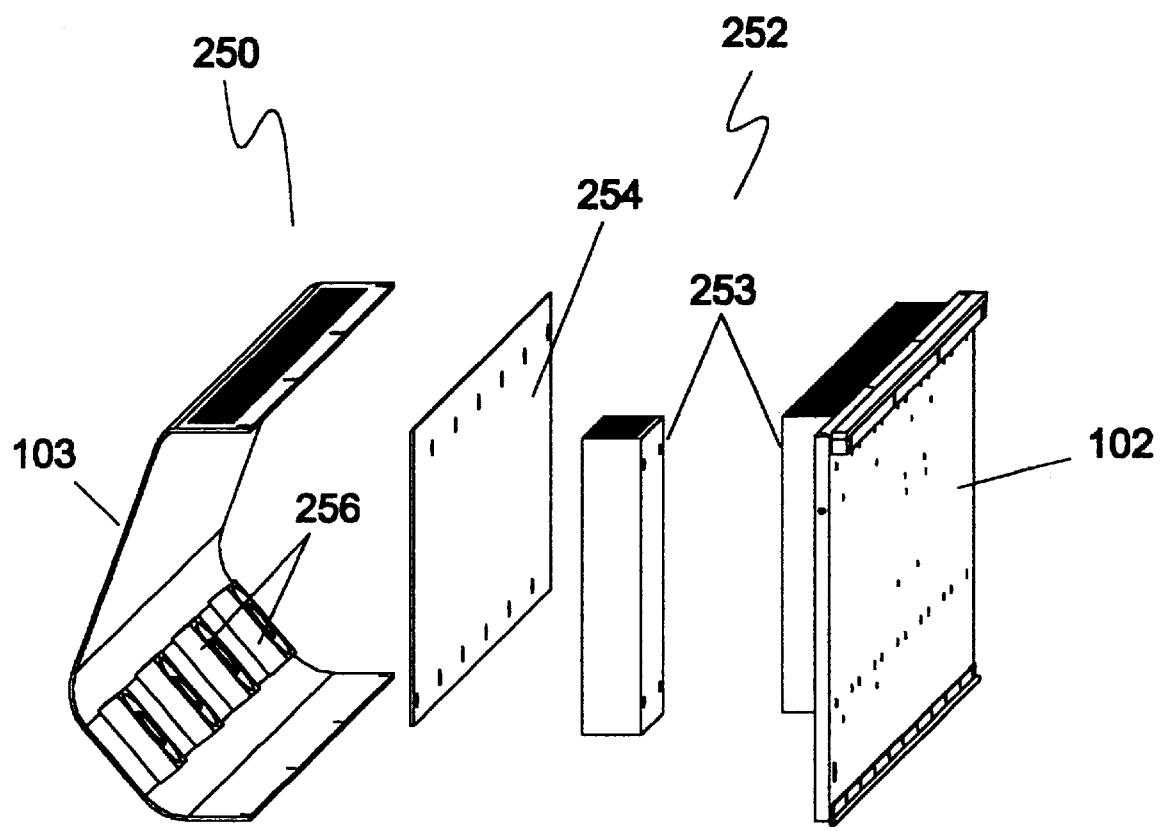
FIG. 6 is an exploded view of one embodiment of a cooling subsystem of the present invention.

Cooling subsystem 250 is used to dissipate the heat generated within projector 100 to the external environment. Turning to FIG. 6, cooling subsystem 250 incorporates heat-exchange components 252 mounted between side cover 102 and shroud 103. Shroud 102 also has a plurality of electric fans 256 mounted to provide a constant forced airflow across heat-exchange components 252. In the preferred embodiment, heat-exchange components 252 are made of any thermal conducting material, preferably aluminum, and include cooling fins 253 and cooling side plate 254. Cooling side plate 254 is used to direct the airflow across cooling fins 253. The heat that is generated by the components within projector 100 is transferred to the cooling fins 252 through cooling side plate 254. Active heat exchangers such as thermoelectric devices may also be used as heat-exchange components 252. For high temperature applications, projector 100 may also be fitted with internal circulating fans 290 shown in FIG. 2.

Figure 7:
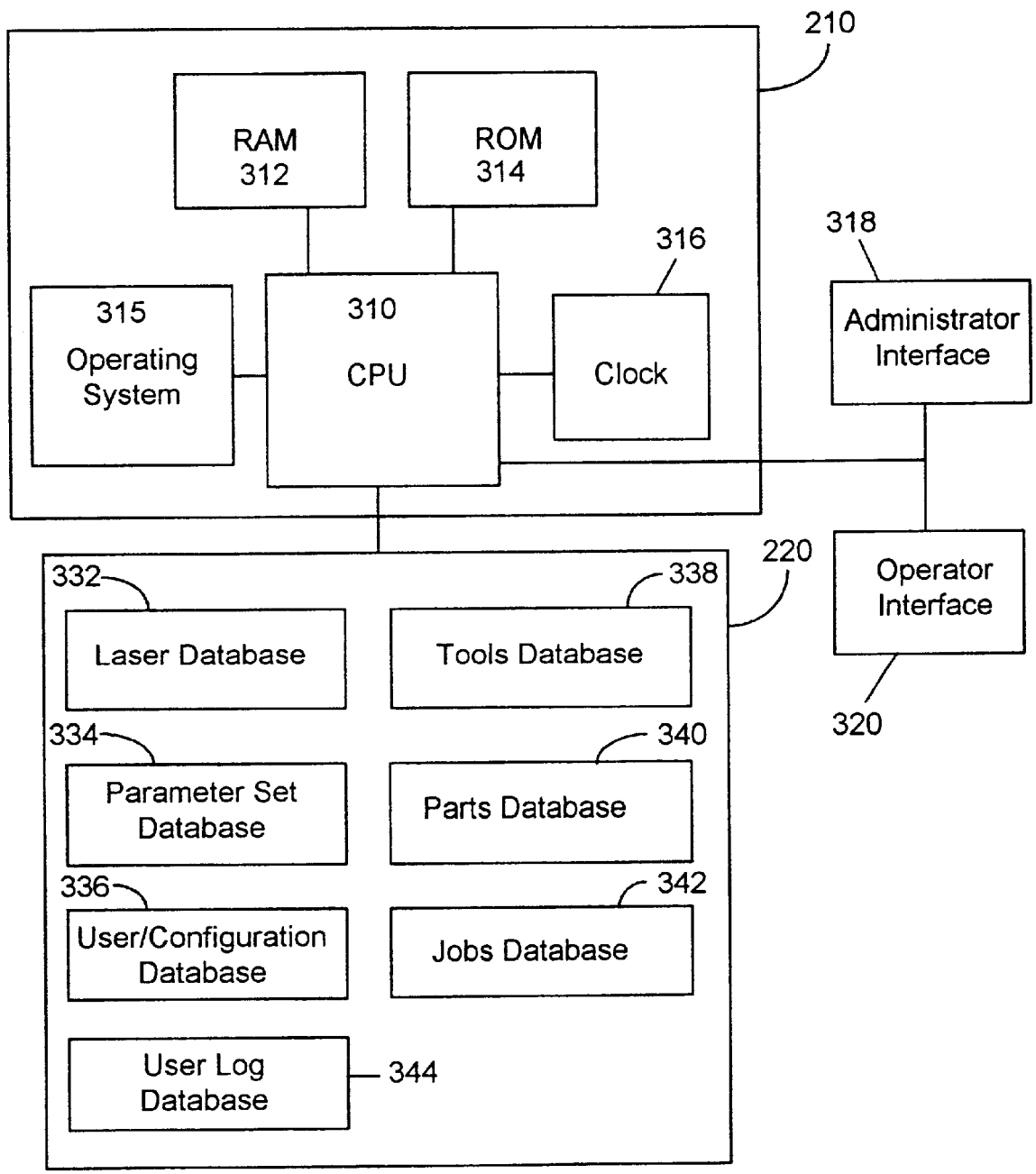
FIG. 7 is a block diagram of one embodiment of the processing component unit of the present invention.

A conventional personal computer or computer workstation with sufficient memory and processing capability, an on-board computer system coupled with data storage device 220 residing in projector 100, or a combination of the three contains all of the software components to operate projector 100. In one embodiment where the system is a stand-alone unit, all of the system components may reside in projector 100 except for the keyboard and display. As shown in FIG. 7, controller module 210 includes a central processing unit 310, random access memory 312, read-only memory 314, operating system 315, and clock 316. Controller module 210 is digitally connected to administrator interface 318, operator interface 320, and data storage device 220.

Data storage device 220 may include hard disk magnetic storage units, optical storage units, or compact disk storage units. Data storage device 220 contains databases used in the present invention including laser unit database 332, parameter sets database 334, user/configuration database 336, tools database 338, parts database 340, jobs database 342, and activity log database 344. Laser unit database 332 contains a list of all lasers connected to the system. For instance, in multi-laser applications, laser unit database 332 will contain a name for each laser in the system. Laser unit database 332 also contains the laser properties specific to each laser such as feedback gain, x-y ratio, x offset, y offset, z offset, IP address, and subnet mask. Parameter sets database 334 contains the parameter set properties for each job in the system. Parameter set properties include the unit of measure, the allowable number of missed targets while still letting the job continue, target search ratio, target scan ratio, tool movement limit, tool movement timer, and tool misalignment limit. Additional properties that may be set in the parameter set properties are zoom enabling, event logging, system diagnostics, and checking tool movement.

User/configuration database 336 contains a list of all authorized users of the system. User/configuration database 336 includes the name of each authorized user, the security level, i.e. accessibility to the system, and the location of the data files and software.

Tools database 338 contains a list of all jobs in the database. Each database tool has a specific name and contains specific tool reference target information and properties. Tool properties include the target number, target name, the x-y-z position of the target, the search ratio, the scan ratio, the x angle, the y angle and the distance measurement between the laser projector and the target. The x-y-z position of each target may be manually entered or imported into the database. The scan and search ratio uses a continuous wave beam for finding the targets. Tool properties also include the ability to add new reference targets, update individual target information, delete targets, and to draw an image showing placement of the targets.

Parts database 340 contains each part name and the various layers that are incorporated into each part. This can be better understood by visualizing the various layers as subparts for each part or each layer as being a sub-emplate that is one sub-template of the entire template, i.e. part. Each layer has a series of points categorized by point number and point name. Parts database 340 further includes part and layer maintenance information, point maintenance information and text maintenance information. It is this information coupled with the distance measurement and the algorithm for determining the role, pitch and yaw of projector 100 that allows the 3-D image to be properly projected. Any of the information in parts database 340 may be changed at any time through the Administrator program. Some information may be changed through the Operator program depending on the security clearance level of the operator.

Jobs database 342 contains a list of jobs on which the laser system is used. Each job has an individual job name and particular job properties. Job properties include a designation of the available lasers and the lasers to be used for the particular job from laser database 332. Parameter sets for each laser chosen from parameter set database 334, the tool from tool database 338 and the parts to be used from parts database 340 may also be chosen. The jobs database 342 also allows the administrator to set the operator's ability to change the lasers, parts and jobs of a particular job. Activity log database 344 maintains a log of system and user operations and time-stamps each activity using internal clock 316.

It should be understood that a stand-alone unit may also be the combination of a conventional personal computer and projector 100 or a computer workstation coupled to a server and projector 100. The administrator software and operator software may reside on projector 100, on the server or on the personal computer or some combination.

It is also possible to network multiple imaging heads into a system that allows coverage of relatively large work pieces. The use of multiple imaging heads also allows for better aspect ratio of a 3D work piece, i.e. covers work piece contours more efficiently. In a multi-head system, the controller module on one of the heads is configured as the master and the remaining heads are configured as slaves. Each head is connected to a hub using 10-base T Ethernet connector. The hub is typically connected to a server. In a multi-head system, the administrator and operator application software may be stored on the server, on a workstation, or some combination of the server, workstation and projector 100.

Figure 8:
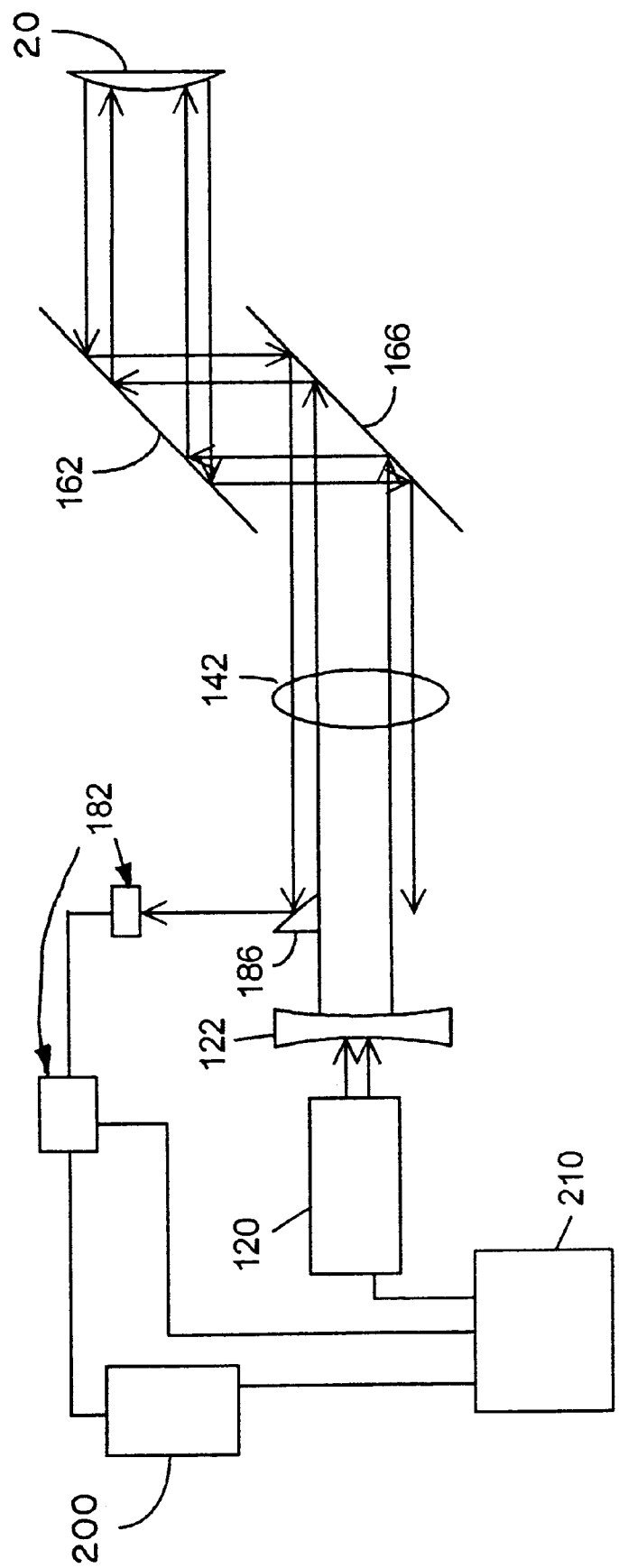
FIG. 8 is a schematic representation of the range-finding system of the present invention.

In operation, the range-finding system of projector 100 provides for low and high resolution adjustments. FIG. 8 is a schematic representation of the range-finding system of projector 100. In the preferred embodiment, the laser beam from laser emitting component 120 is passed through a −12.5 mm focal length collimating lens 122 to produce an 8 mm diameter laser beam. The laser beam passes through focus lens 142 having a 100 mm focal length and redirected by reflective optical elements 162 and 166 to retro-reflective surface of reference sensor 20. Focus lens 142 has an adjustment range of ±2 inches. The return beam has a diameter of greater than 8 mm and retraces the same path back through focus lens 142. At a point between focus lens 142 and collimating lens 122, adjustable reflective element 186 is placed into the return beam to the edge of the 8 mm initial beam. The return beam is directed to photo optic sensor 182 where the optical signal is converted to a digital signal and analyzed by the controller module 210.

Figure 9:
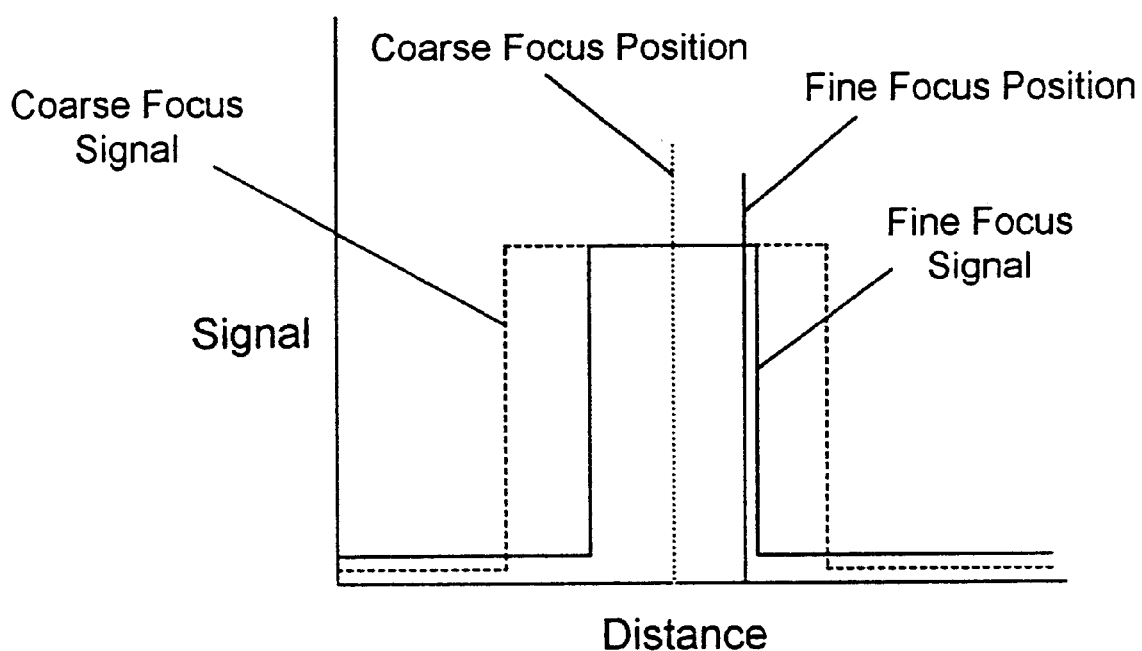
FIG. 9 is a graphical representation of the laser focusing system of the present invention.
Figure 10:
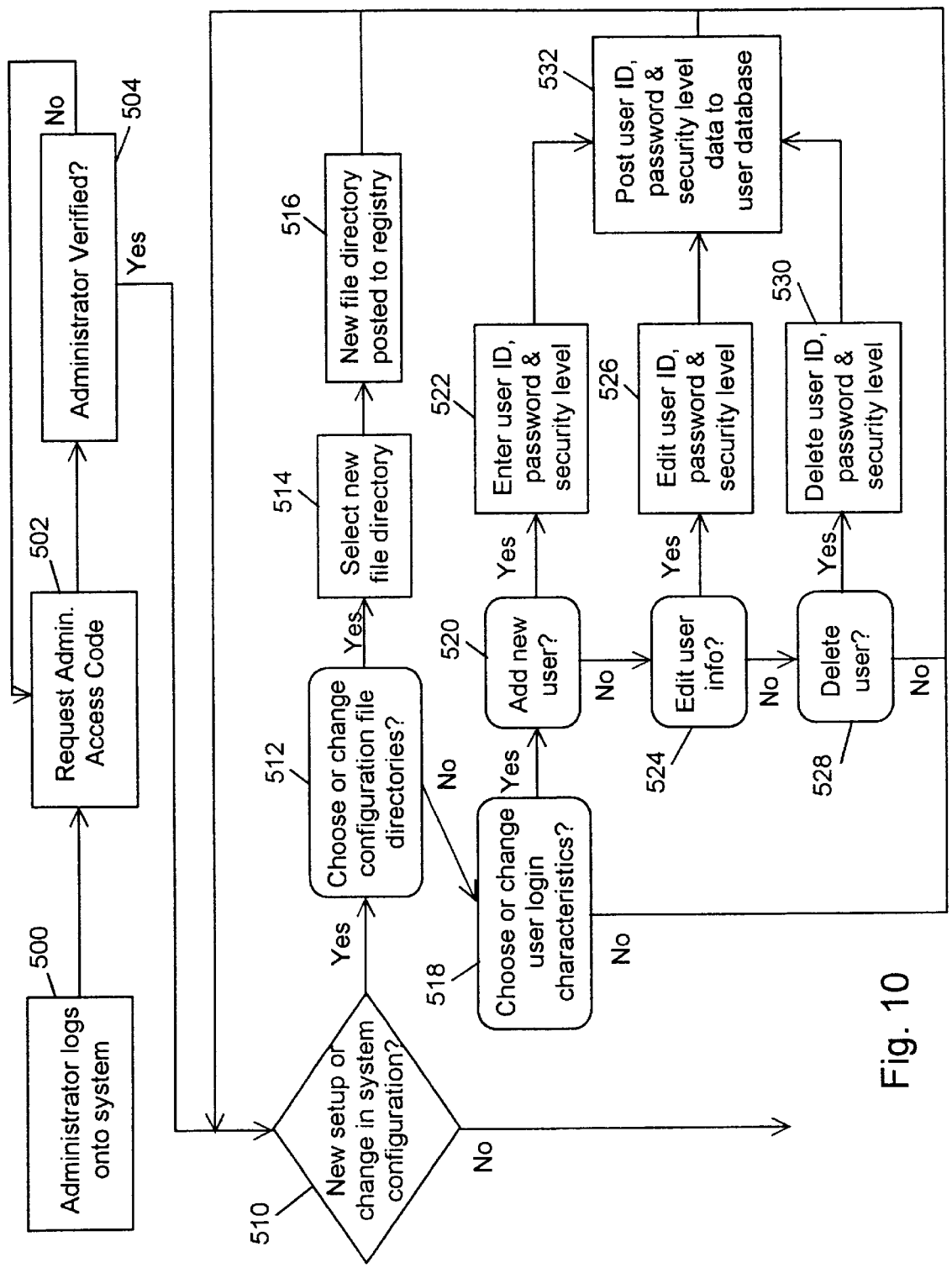
FIGS. 10–13 illustrate an embodiment of the present invention showing how the system is initialized and variables defined by a system administrator.

To accurately measure the distance between the projector 100 and a reference sensor 20, the range-finding system must perform a coarse focus followed by a fine focus of the laser beam onto reference sensor 20. The initial coarse focus may be done manually or automatically. To begin distance measuring, a continuous wave laser light from light emitting component 120 is placed on or near a reference sensor 20. The imaging system software causes projector 100 to scan an area in the vicinity where the reference sensor 20 is located. A return signal is received as the laser beam crosses reference sensor 20. The midpoint of the return signal is chosen as the center from which a fine focus is next performed. To perform the fine focus, the laser beam is switched from a continuous wave light to a pulsating wave light. The pulsing rate is provided in a range of $2^{n+5}$ where n is 0 to 15. For example, the pulsating rate may provide a pulsing range of $2^{10}$ to $2^{20}$ or a frequency range of 1.024 kHz to 1.048576 MHz. The pulsing rate is stepped by a power of 10, e.g. $2^{10}, 2^{11}, 2^{12}, \ldots, 2^{20}$. The data is compared to an empirical lookup table to pick the best frequency for the range. The empirical lookup table contains data relating to laser beam diameters, pulse rate and distances. Once the best frequency is chosen, then the clock counter is set in timing device 200. A graphical representation of the coarse focus is illustrated in FIG. 9. For each pulse, the high-speed chronometer records the time of flight from the start of the pulse to the recording of the return pulse at photo optic sensor 182.

Projector 100 is operated by software having two major components, an Administrator program and an Operator program. The Operator program may be configured as a master, a slave or a master/slave. The Administrator program provides for the administration of the various databases used in operating the 3-D projection system of the present invention. It also defines the accessibility levels for various operators regarding the various databases. The Administrator program may reside on data storage device 220, a server, a personal computer, or a workstation connected to projector 100. The Operator program allows an operator to use the 3-D projection system to project templates onto work pieces. The Operator program may also reside on data storage device 220, a server, a personal computer, or a workstation. Preferably, Operator program is on data storage device 220.

FIGS. 10–13 describe the process of how a system administrator setups and/or changes the operating characteristics of projector 100 to meet work piece specifications. At step 500, a system administrator logs onto the system using administrator interface 318 establishing a communication link with projector 100. An administrator user name and access code is requested at step 502. An administrator access code is typically obtained and stored in user/configuration database 336 upon initial setup of the administrator software using a pre-defined registration code or number provided with the software package. The administrator then enters the administrator's user name and access code at step 502. At step 504, the administrator's user name and access code are verified against the user name and access code stored in the user/configuration database 336.

At this point, the administrator is presented with several options including changing user setup or configuration at step 510, modifying laser information at step 540, modifying parameter sets information at step 560, modifying tools information at step 580, modifying parts information at step 600, modifying jobs information at step 620, or exiting the administrator program at step 640. If the administrator wishes to modify the file directories, the administrator selects to change the configuration file directories at step 512. At step 514, the administrator selects the new file directory. After selecting the new file directory, the administrator sends the selection and the new file directory is posted to the software registry at step 516.

If the administrator wishes to modify user login characteristics, the administrator selects to change the user login information at step 518. The administrator is then presented with the choice of adding a new user, editing existing user information or deleting current user information. If the administrator selects to add a new user at step 520, the administrator is then prompted to enter the new user's name, password and security level at step 522. After entering the new user information, the administrator sends the information and the new user information is posted to the user/configuration database 336 at step 532. If the administrator selects to edit existing user information at step 524, the administrator then selects the user name to edit and is allowed to edit the user name, user password and user security level at step 526. After editing the user information, the administrator sends the information and the information is posted to user/configuration database 336 at step 532. If the administrator selects to delete an existing user from the system at step 528, the administrator selects the user name to delete at step 530. After selecting the user name to delete, the administrator sends the delete command and the user information stored in user/configuration database 336 is deleted at step 532.

Figure 11:
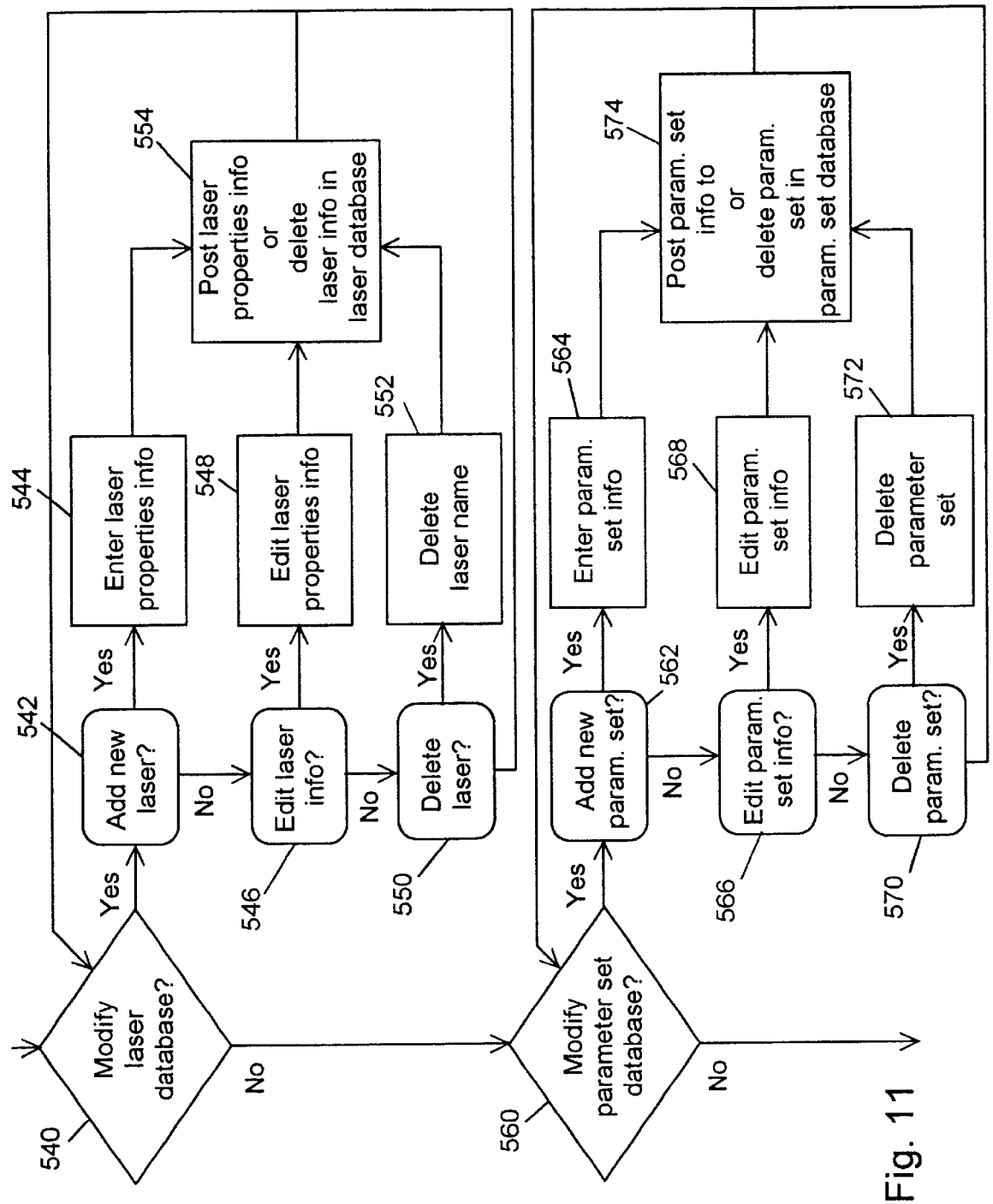

Referring now to FIG. 11, if the administrator wishes to modify laser information, the administrator selects to change the laser information at step 540. The administrator is then given a choice of adding a new laser, editing existing laser information or deleting current laser information. If the administrator selects to add a new laser at step 542, the administrator is then prompted to enter the new laser's name and properties at step 544. After entering the new laser information, the administrator sends the information and the new laser information is posted to the laser database 332 at step 554. If the administrator selects to edit existing laser information at step 546, the administrator then selects the laser name to edit and is allowed to edit the laser properties at step 548. After editing the laser information, the administrator sends the information and the information is posted to laser database 332 at step 554. If the administrator selects to delete an existing laser from the system at step 550, the administrator selects the laser name to delete at step 552. After selecting the laser name to delete, the administrator sends the delete command and the laser information stored in laser database 336 is deleted at step 554.

If the administrator wishes to modify the parameter set information, the administrator selects to change the parameter set information at step 540. Parameter set information is specific for a particular job in the jobs database 342. The administrator is then given a choice of adding a new parameter set, editing existing parameter set information or deleting current parameter set information. If the administrator selects to add a new parameter set at step 562, the administrator is then prompted to enter the new parameter set's name and properties at step 564. After entering the new parameter set information, the administrator sends the information and the new parameter set information is posted to the parameter sets database 334 at step 574. If the administrator selects to edit existing parameter sets information at step 566, the administrator then selects the parameter set name to edit and is allowed to edit the parameter set properties at step 568. After editing the parameter set information, the administrator sends the information and the information is posted to parameter sets database 334 at step 574. If the administrator selects to delete an existing parameter set from the system at step 570, the administrator selects the parameter set name to delete at step 572. After selecting the parameter set name to delete, the administrator sends the delete command and the parameter set information stored in parameter sets database 334 is deleted at step 574.

Figure 12:
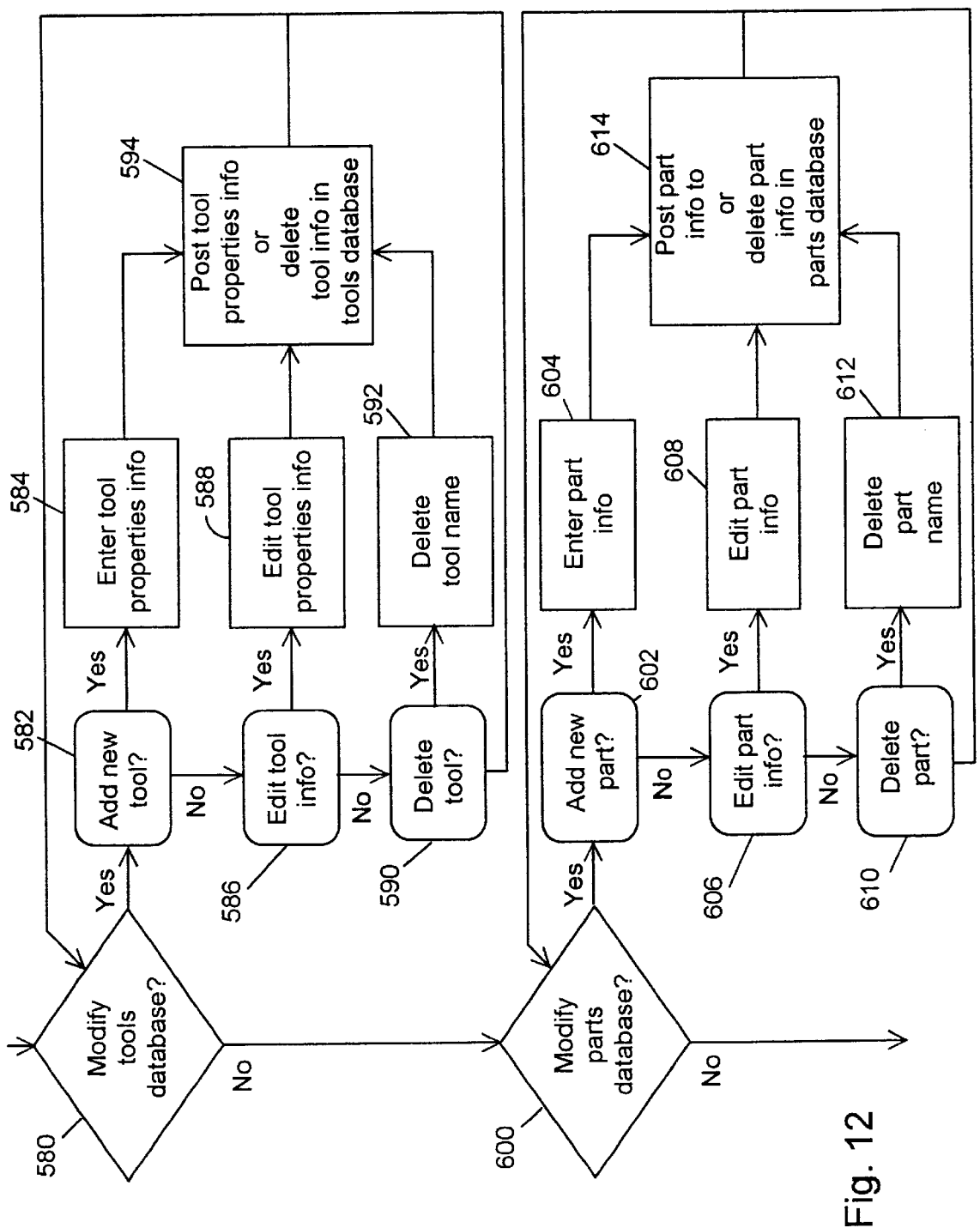

Turning now to FIG. 12, if the administrator wishes to modify tools information, the administrator selects to change the tools information at step 580. The administrator is then given a choice of adding a new tools, editing existing tools information or deleting current tools information. If the administrator selects to add a new tools at step 582, the administrator is then prompted to enter the new tool's name and properties at step 584. After entering the new tool information, the administrator sends the information and the new tool information is posted to the tools database 338 at step 594. If the administrator selects to edit existing tools information at step 586, the administrator then selects the tool name to edit and is allowed to edit the tool properties at step 588. After editing tool information, the administrator sends the information and the information is posted to tools database 338 at step 594. If the administrator selects to delete an existing tool from the system at step 590, the administrator selects the tool name to delete at step 592. After selecting the tool name to delete, the administrator sends the delete command and the tool name with all of its accompanying information stored in tools database 338 is deleted at step 594.

If the administrator wishes to modify parts information, the administrator selects to change the parts information at step 600. The administrator is then given a choice of adding a new parts, editing existing parts information or deleting current parts information. If the administrator selects to add a new part at step 602, the administrator is then prompted to enter the new part's name and properties at step 604. After entering the new part information, the administrator sends the information and the new information is posted to the parts database 340 at step 614. If the administrator selects to edit existing parts information at step 606, the administrator then selects the part name to edit and is allowed to edit the part properties at step 608. After editing part information, the administrator sends the information and the information is posted to parts database 340 at step 614. If the administrator selects to delete an existing part from the system at step 610, the administrator selects the part name to delete at step 612. After selecting the part name to delete, the administrator sends the delete command and the part name with all of its accompanying information stored in parts database 340 is deleted at step 614.

Figure 13:
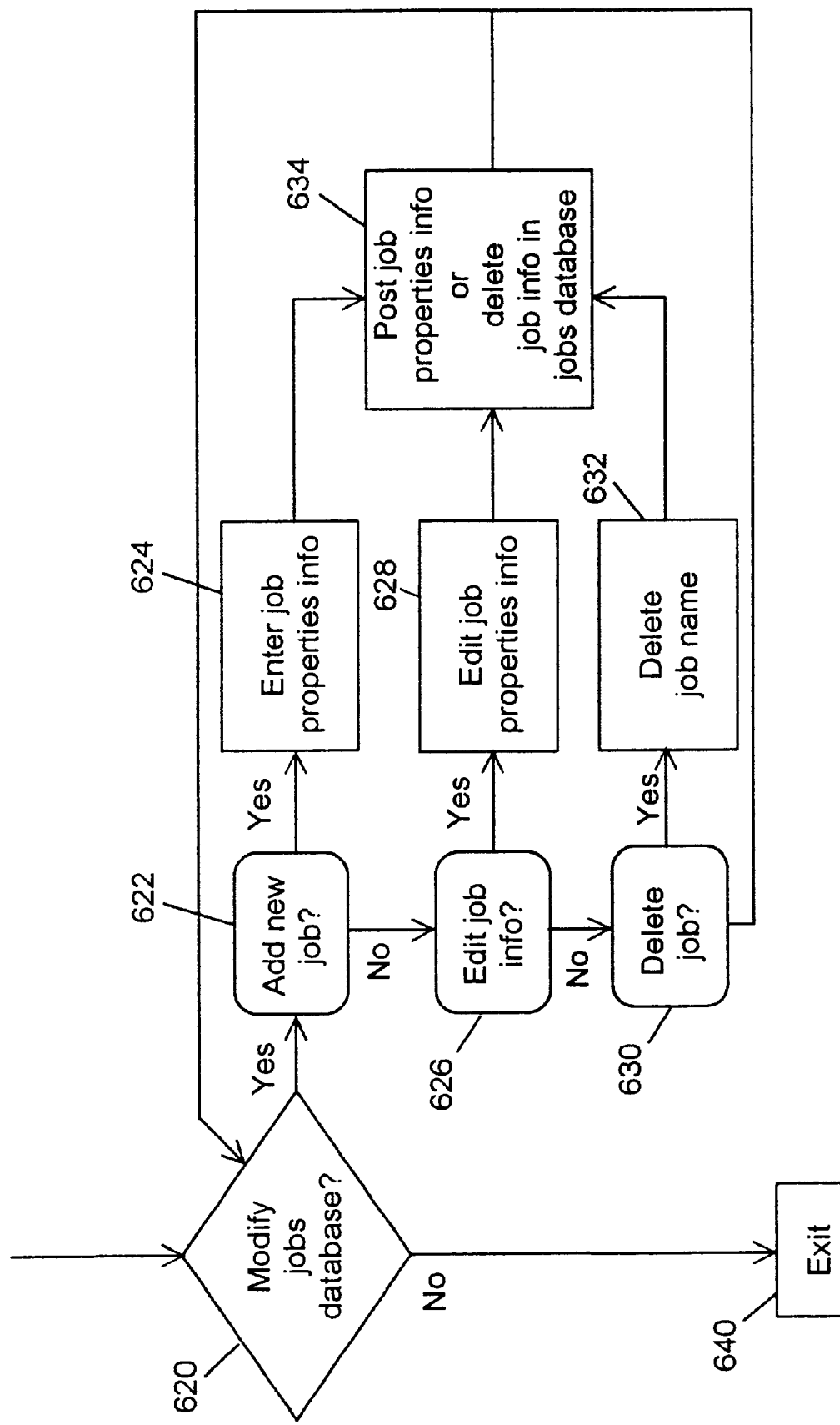
Figure 14:
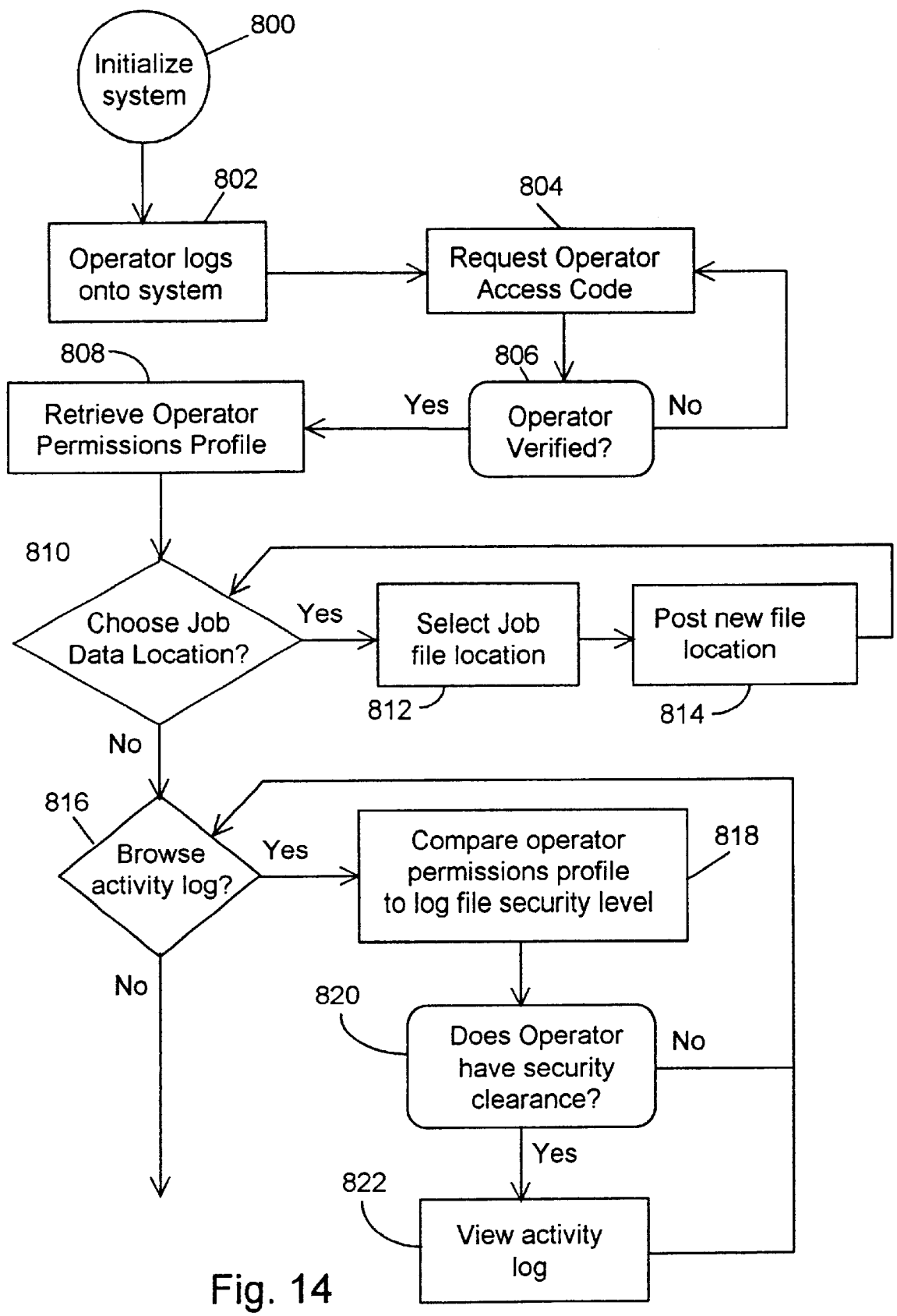
FIGS. 14–22 illustrate an embodiment of the present invention showing how the system is operated by a system operator.

Turning now to FIG. 13, if the administrator wishes to modify jobs information, the administrator selects to change the jobs information at step 620. The administrator is then given a choice of adding a new job, editing existing jobs information or deleting current jobs information. If the administrator selects to add a new job at step 622, the administrator is then prompted to enter the new job's name and properties at step 624. After entering the new job information, the administrator sends the information and the new job information is posted to the jobs database 342 at step 634. If the administrator selects to edit existing job information at step 626, the administrator then selects the job name to edit and is allowed to edit the job properties at step 628. After editing job information, the administrator sends the information and the information is posted to jobs database 342 at step 634. If the administrator selects to delete an existing job from the system at step 630, the administrator selects the job name to delete at step 632. After selecting the job name to delete, the administrator sends the delete command and the job name with all of its accompanying information stored in jobs database 342 is deleted at step 634. The administrator may also exit the system at step 640.

The Operator software restricts the operations allowed to be done by the operator. For instance, a particular job may not allow the operator to change anything about the job, i.e. the lasers to be used, the parameter set, the tool set, and the parts of the particular job. On the other hand, the security clearance of the operator and the limits set through the Administrator program may allow the operator to change some or all of the various components of a particular job.

FIG. 14–22 describe the process of how the operator interfaces with the laser system. At step 800 in FIG. 14, the operator initializes the system if the system is not already initialized. The operator begins by logging onto the system using operator interface 320 establishing a communication link with projector 100 at step 802. At step 804, an operator access name and code is requested. The operator user name and access code are configured into the system through the Administrator program. The operator then enters the operator's user name and access code at step 804. At step 806, the operator's user name and access code are verified against the user name and access code stored in the user/configuration database 336. If verified, the system retrieves the operator's permissions profile, i.e. security level, which determines the operator's ability to change various items in the job setup.

At this point, the operator is presented with several options including choosing the file location of a job at step 810, browsing the activity log at step 816, choosing a particular job 824, and exiting the operator program at step 825. In the event that the job location data files have be moved or changed, the operator is able to choose the correct jobs data location at step 810. At step 812, the operator selects the proper file location and the new file location is posted to the registry files of the system at step 814. If the operator wishes to browse the user activity log in user activity log database 344, the operator selects to browse the log at step 816. The operator program compares the operator's permissions profile to the log file security level at step 818. If the operator's security level is high enough, then the operator is allowed to view the activity log at step 822. If not, then the operator is refused entry and the activity log is not displayed.

Figure 15:
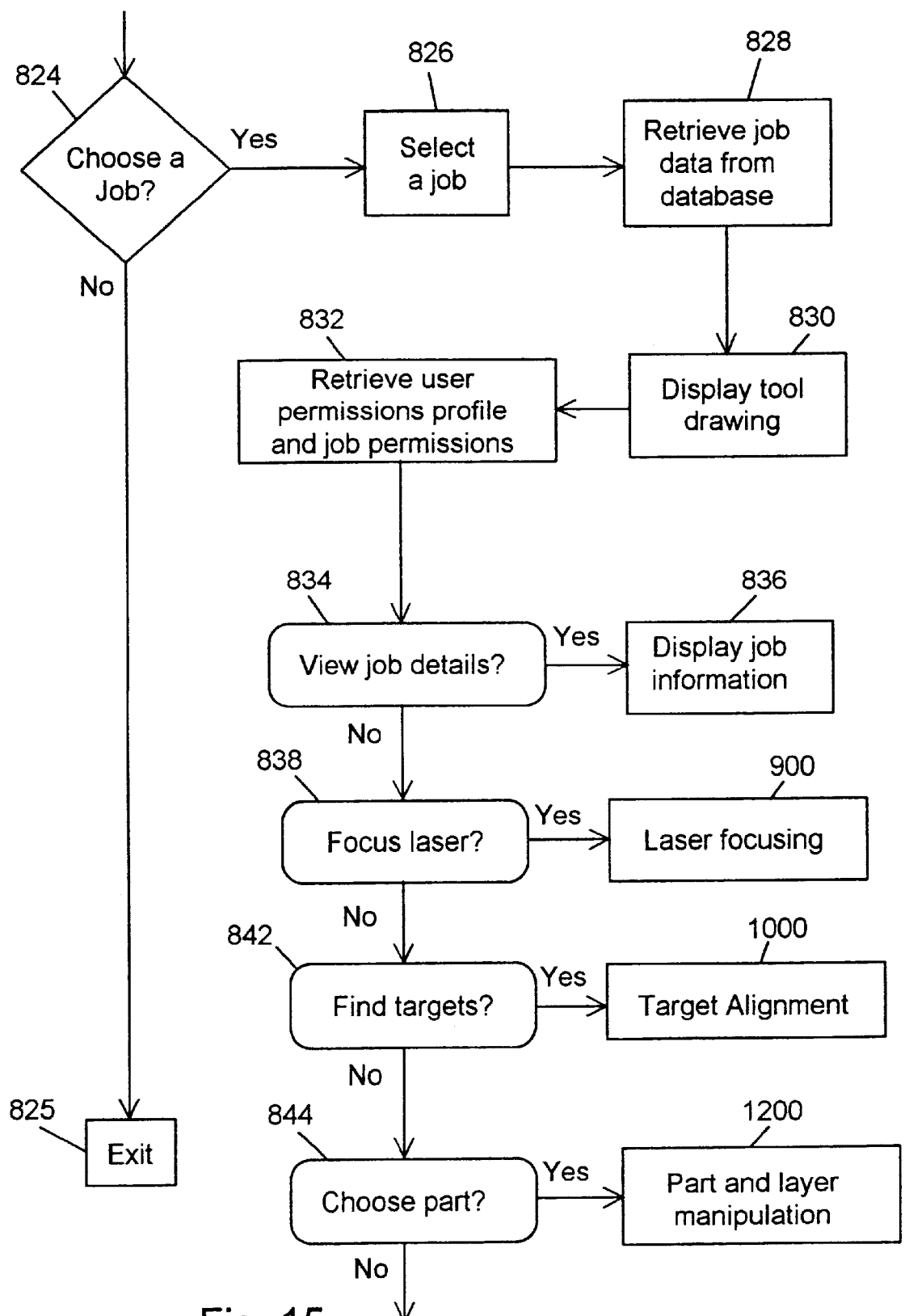

Turning now to FIG. 15, the operator may want to operate projector 100 to perform a particular job. At this point, the operator may choose a job at step 824 or exit the program and system at step 825. If the operator wishes to perform a particular job, the operator selects the job at step 826. When the job is selected, all of the job's data information is retrieved from jobs database 342 at step 828. At step 830, the tool is displayed on display 10 of operator interface 320 and the system retrieves the user permissions profile and the job permissions at step 832. A graphical user interface presents the operator with a variety of options that the operator may choose. These options are to view job details at step 834, focus the laser at step 838, find the retro-reflective targets 20 at step 842, choose a particular part for the tool at step 844, change the selection of lasers for the job at step 846 in FIG. 16, change the selection of parts for the job at step 860, change the tool for the job at step 876 in FIG. 17, and exit the program at step 890. The ability for the operator to change the lasers, the parts and the tool is dependent on the operator's permissions profile and the job permissions. The combination of operator permissions profile and job permissions may prevent the operator from making any changes to the job to full-scale ability to change every aspect of the job.

As illustrated in FIG. 15, if the operator wishes to view the job details at step 834, then the job information retrieved from jobs database 342 is displayed at step 836. At step 838, the operator may choose to focus the laser(s). If this operation is selected, then the laser focusing operation is carried out at step 900. Under the laser focusing operation, the operator may manually focus the laser on each target or perform a semi-automated focus or a fully automated focus. Under the fully automated option, the program will automatically find the targets at step 1000 then focus the laser for optimal performance for the particular part. The operator must find the targets for a particular job at the beginning of each new session at step 842 in order to properly align the template projections onto the tool. The operator may also have projector 100 find the targets at various times during a particular job to re-align the projected templates when the tool is accidentally moved.

Figure 16:
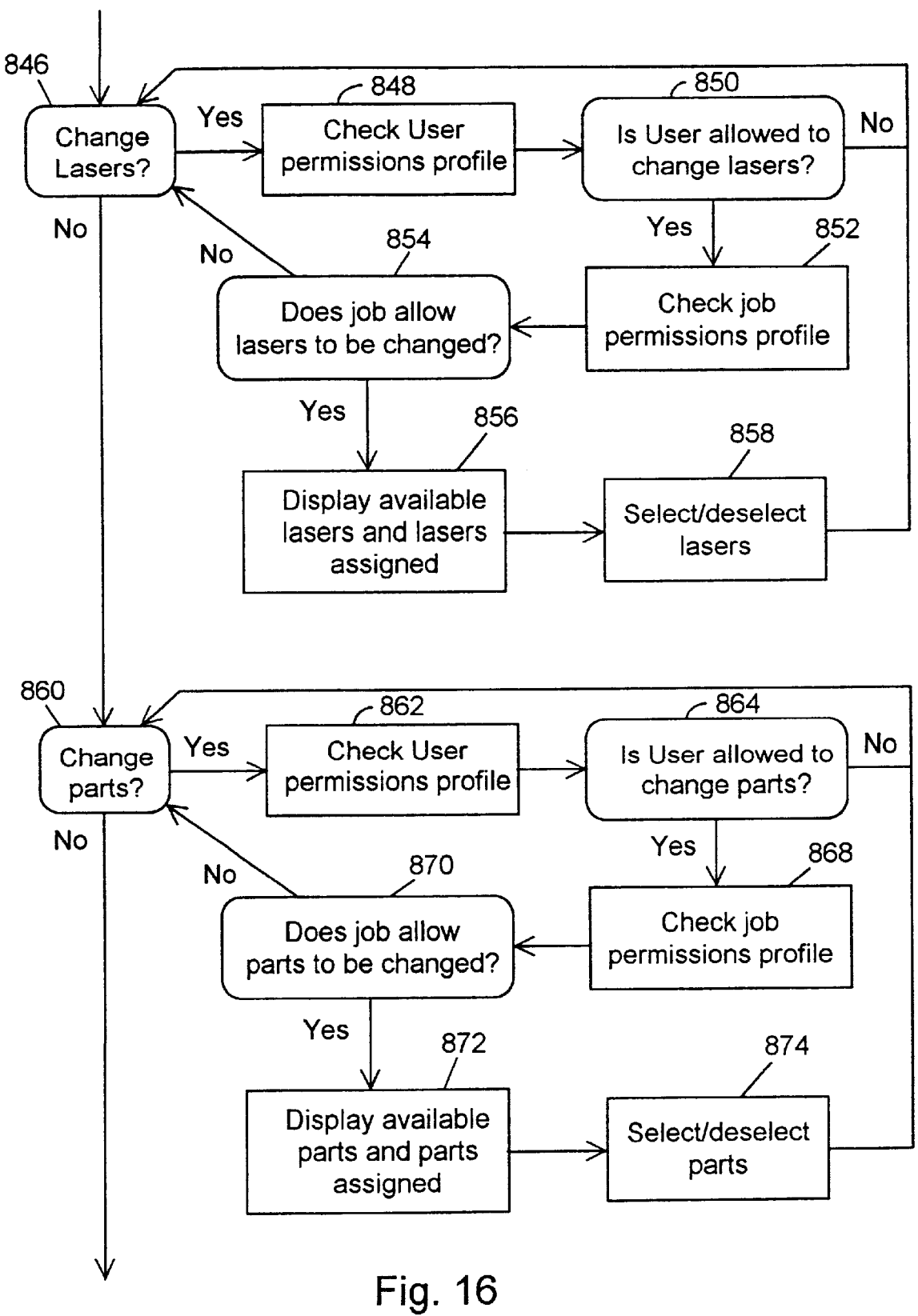
Figure 17:
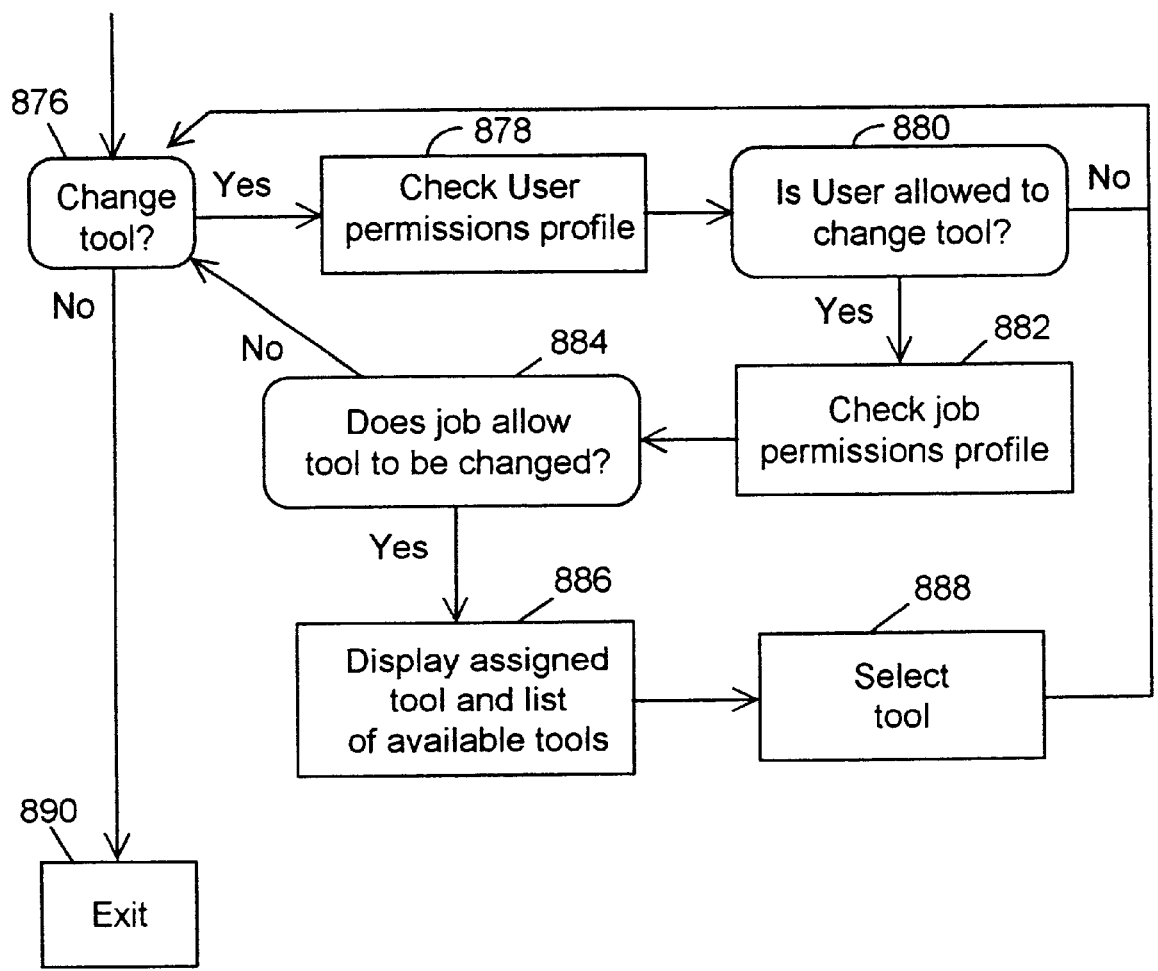

As previously discussed, the operator permissions profile and the job permissions will determine the extent the operator may change the lasers, the parts and the tools. As illustrated in FIGS. 16 and 17, the operator-allowable options are determined. At step 848, the user permissions profile is checked to determine whether the operator is allowed to change the lasers for the job. If the permissions profile allows the operator to change the lasers at step 850, then the job permissions are checked at step 852, otherwise the operator is not allowed to change the lasers and the change-laser function is disabled. If the job permissions allows the lasers to be changed at step 854, then the list of currently assigned lasers and available lasers are presented to the operator at step 856. The operator may then select or deselect one or more lasers at step 858. Similarly with parts at step 860, the user permissions profile is checked at step 862 to determine whether the operator is allowed to change the parts for the job. Again if the permissions profile allows the operator to change the parts at step 864, then the job permissions are checked at step 868. Otherwise, the operator is not allowed to change the parts and the change-parts function is disabled. If the job permissions allows the parts to be changed at step 870, then the list of currently assigned parts and available parts are presented to the operator at step 872. The operator may then select or deselect one or more of the parts at step 874. Because only one tool can be presently used at a time, only one tool may be assigned. As with the previous options, the user permissions profile is checked at step 878 to determine whether the operator is allowed to change the tool for the job. Again if the permissions profile allows the operator to change the tool at step 880, then the job permissions are checked at step 882. Otherwise, the operator is not allowed to change the tool and the change-tool function is disabled. If the job permissions allow the tool to be changed at step 884, then the currently assigned tool and a list of available tools are presented to the operator at step 886. The operator may then select a different tool at step 888.

Figure 18:
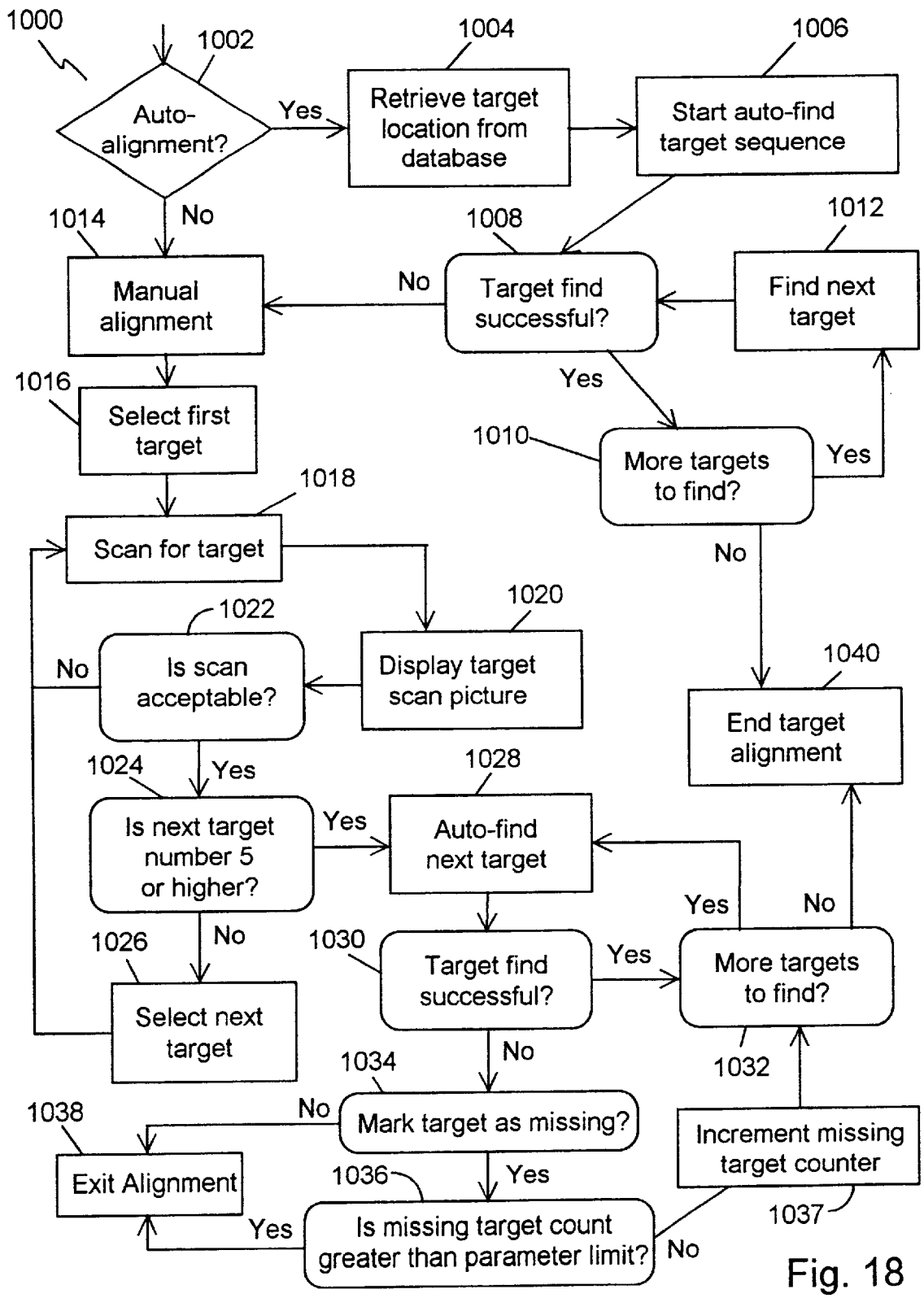

Turning now to FIG. 18, there is shown the process for aligning the projector 100 with object 30. The operator may perform an auto-alignment at step 1002 or a manual alignment at step 1014. If the operator chooses auto-alignment, then the target locations are retrieved at step 1004 and the auto-find target sequence is started at step 1006. If the first target is successfully found at step 1008 then the sequence continues by checking to see if there are more targets in the target list at step 1010 and the sequence continues for each target. When the end of the target list is reached then target alignment is ended at step 1040. If the a target is not found at step 1008 during the sequence and the number of missed targets exceeds the number of missed targets allowed for the job, then the system prompts the operator to perform manual alignment at step 1014.

The operator may also choose manual alignment at step 1014. If manual alignment is chosen, the operator is prompted to select the first target at step 1016. After the operator selects the first target, the system does a laser scan for the target at step 1018 and displays a picture of the scanned target at step 1020. At step 1022, the operator decides if the scan is acceptable. If the scan is not acceptable, the same target is re-scanned. The operator may perform a rough re-alignment of the laser beam on the target before the re-scan is performed. When the scan is acceptable, the system checks the total number of targets that have been manually scanned at step 1024. If four targets have not been scanned the operator must select the next target at step 1026 and the sequence of scanning the target, displaying a picture of the scan, and determining acceptance is conducted until four targets have been successfully identified and scanned. At that time, the system steps into an auto-find mode for the remaining targets at step 1028. In auto-find mode, the system checks to see if each target is successfully found at step 1030. As each target is successfully found, the system continues at step 1032 until all targets are successfully found, which then ends target alignment at step 1040. If a target is not found, the operator at step 1034 is asked to mark the target as missing. If the operator chooses not to mark the target as missing, the target alignment process is ended at step 1038. If the operator chooses to mark the target as missing, then at step 1036 the system checks the missing target parameter limit. If marking the target as missing causes the target missing count to exceed the allowable limit, the system exits the target alignment process at step 1038. If marking the target as missing does not exceed the target missing count, then the target missing counter is incremented by one at step 1037 and the auto-find mode continues until all remaining targets are found.

Figure 19:
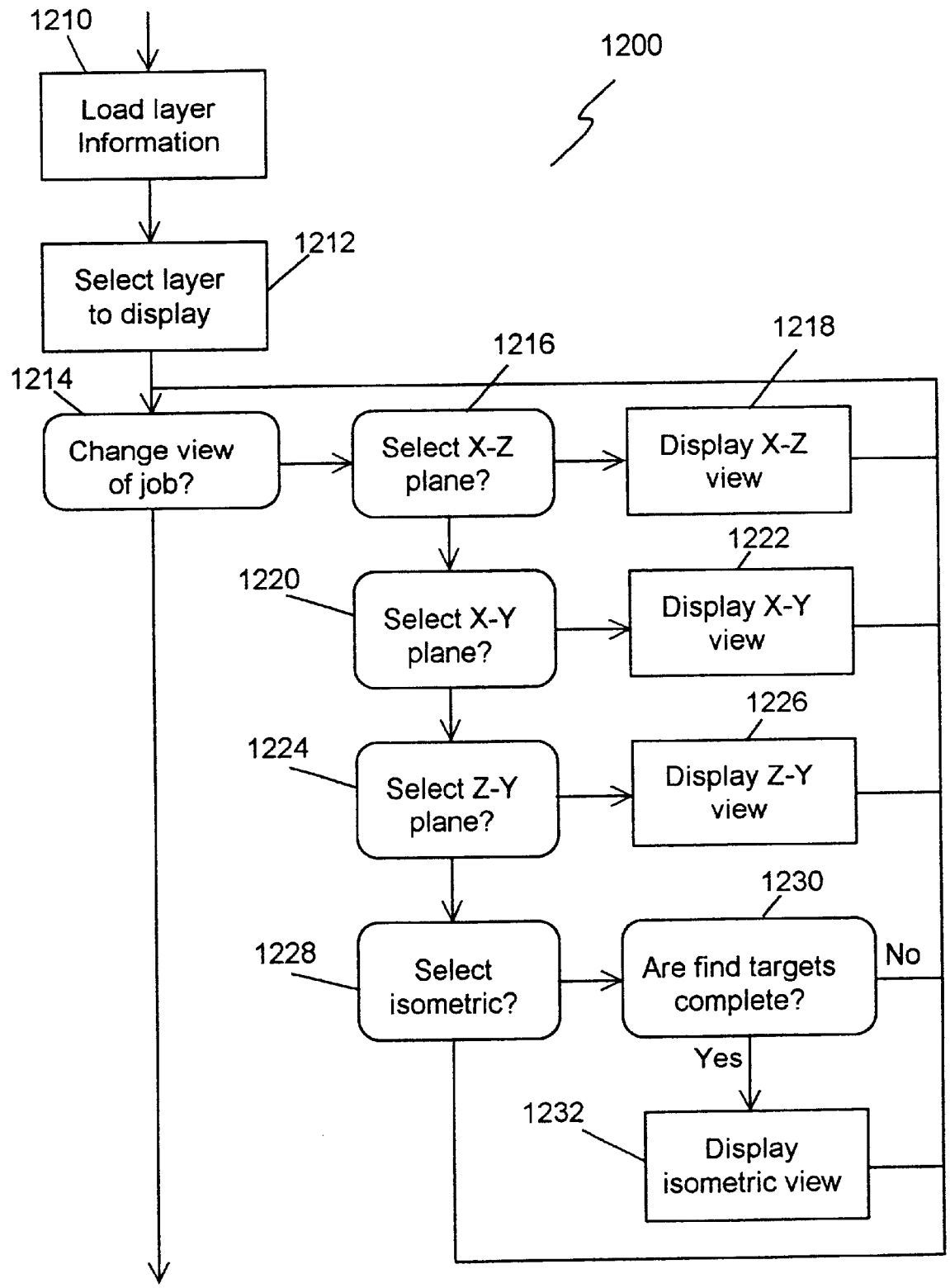
Figure 20:
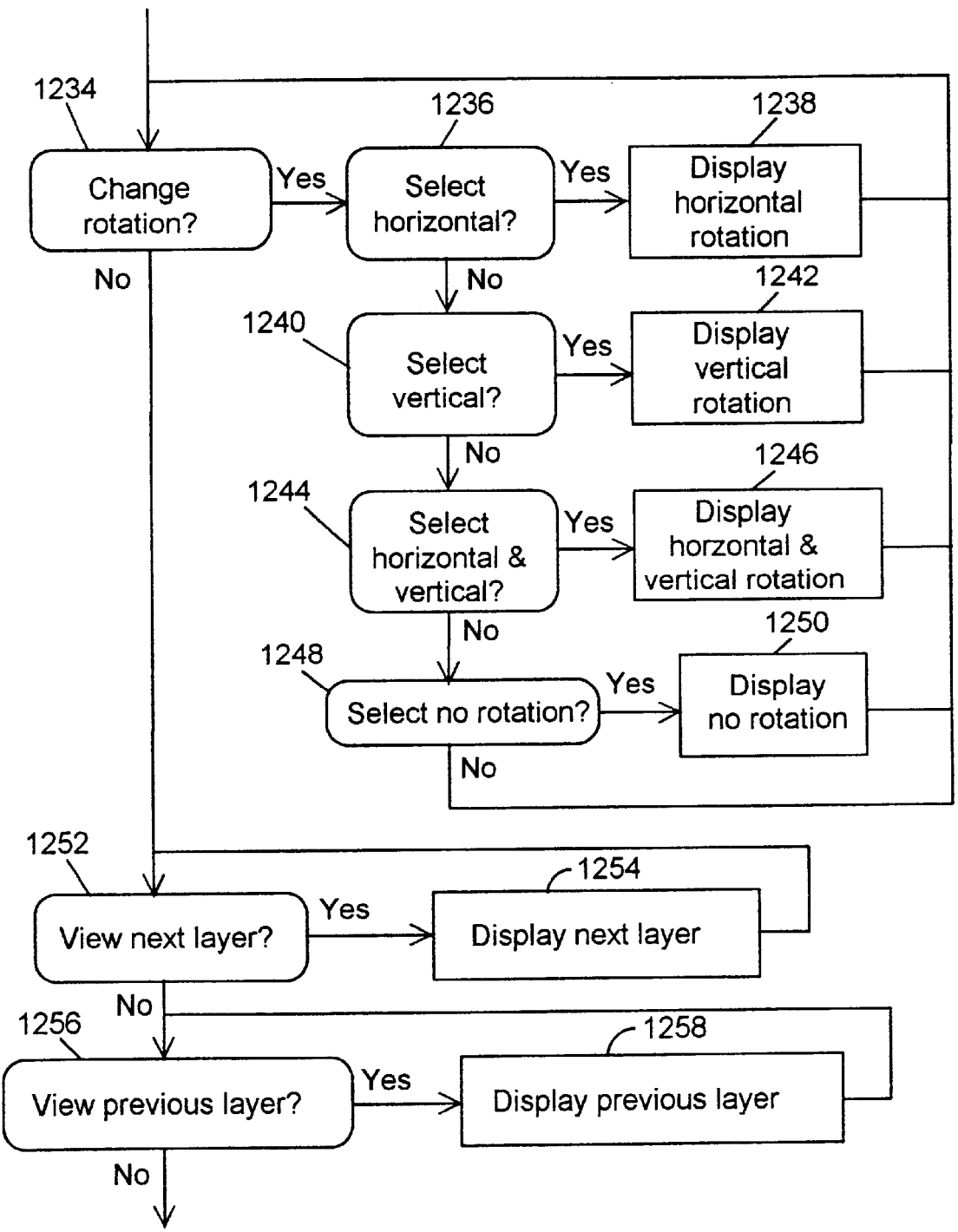
Figure 21:
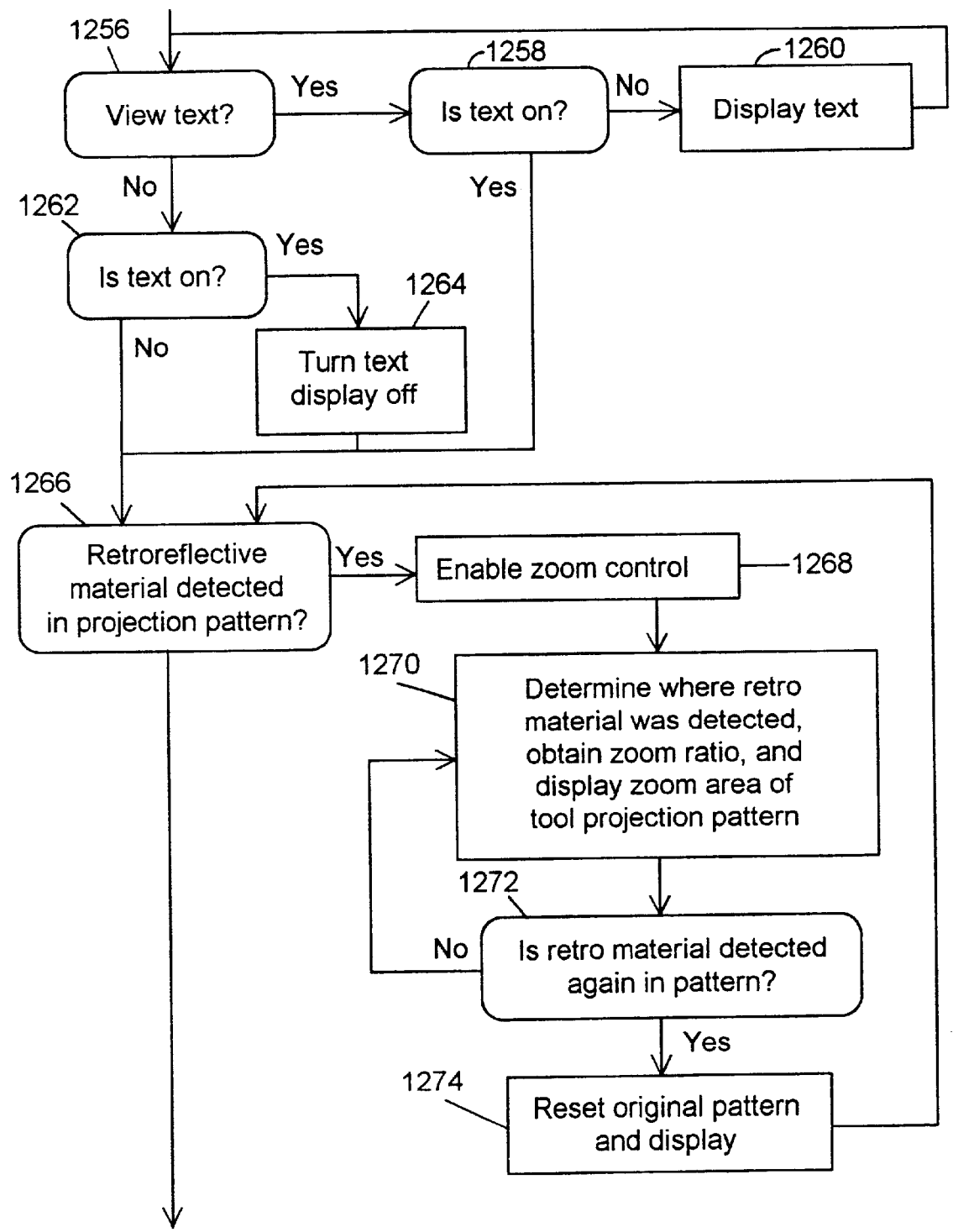

When the operator chooses a particular part at step 844, the operator then may perform various part and layer display manipulations at step 1200. The options available at step 1200 are illustrated in FIGS. 19–21. Turning now to FIG. 19, the layer data for the part is loaded into RAM at step 1210 upon choosing a particular part. The operator then selects the layer to display at step 1212. The operator has the option to change the view of the job at step 1214. The operator may select to view the job in the X-Z plane at step 1216, in the X-Y plane at step 1220, in the Z-Y plane at step 1224, or the isometric view of the job at step 1228. In each of the first three views, the proper view is displayed at steps 1218, 1222 and 1226, respectively. The isometric view can only be viewed if the operator performed the find targets option at step 842. The systems checks at step 1230 to see if the find targets operation was completed. If completed, then the isometric view is displayed at step 1232.

Figure 22:
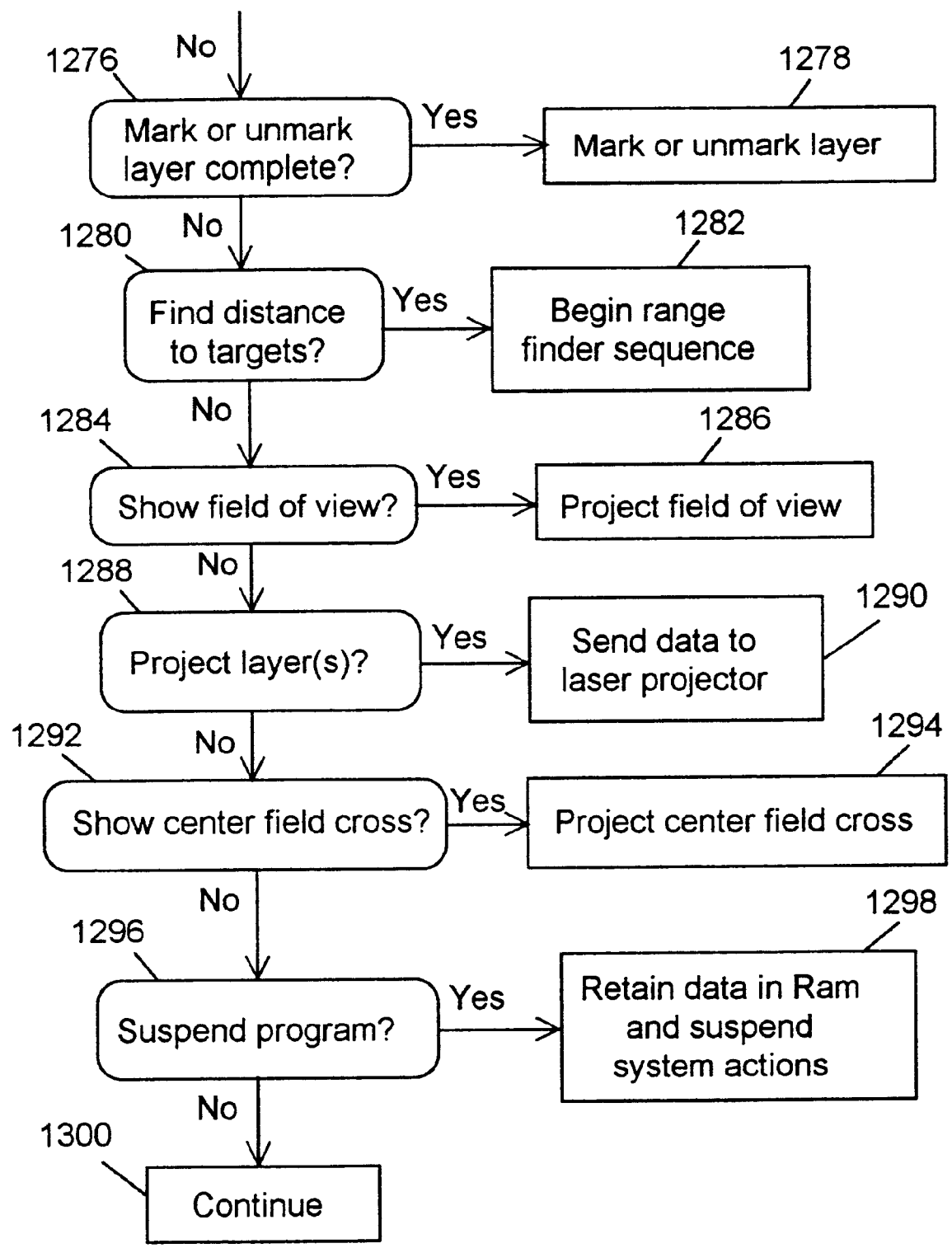

The operator may also change the rotation of the job at step 1234. The operation may select the horizontal, the vertical, both, or no rotation at steps 1236, 1240, 1244, and 1248, respectively. Whatever rotation is selected, the appropriate display is presented to the operator at steps 1238, 1242 and 1246, or no rotational display at step 1250. Further, the operator may also view the next layer at step 1252 or the previous layer at step 1256 and the proper layer is displayed at steps 1254 and 1258, respectively. As illustrated in FIGS. 21 and 22, other manipulative options available to the operator are view text at step 1256, zoom control at step 1266, mark or unmark a particular layer complete at step 1276, find the distance to each target, i.e. range finding, at step 1280, show the field of view at step 1284, project the layer or layers with projector 100 onto object 30 at step 1288, show the center field cross at step 1292, and suspend at step 1296 or continue at step 1300 operation of the program while keeping all data presently loaded in the system at step 1298. If the operator selects to turn text viewing on or off at step 1256, the system checks to see if the text is on at either step 1258 or step 1262. Depending on the status of text viewing at the time, the text is either displayed at step 1260 or turned off at step 1264. By choosing enable the zoom control, the operator or an assistant places a retro-reflective material into the projected pattern at step 1266, which enables zoom control at step 1268. At step 1270, the system determines where the retro-reflective material is detected in the projection, obtains a zoom ratio and displays the zoom area of the tool projection pattern. If the operator or assistant places the retro-reflective material in the patter again and it is detected by the system at step 1272, the system resets to the original pattern and display at step 1274.

Turning now to FIG. 22, the layers are marked or unmarked as complete at step 1276 by the operator simply clicking on a particular layer. The operator also has the option at step 1280 to find the distance to the targets. If chosen, the range-finding option and sequence begins at step 1282. As described above, if the operator chooses any of the remaining options such as show field of view (1284), project layers (1288), show center field cross (1292), and suspend the program (1296), then the system will perform the requested operation, i.e. project field of view (1286), send data to the laser projector (1290), project the center field cross (1294), and suspend system actions while retaining the data in RAM (1298), respectively.

A key feature of the present invention is its ability to find the distance between projector 100 and at least one retro-reflective target 20. Even though one target may be used, it is preferable that three targets be measured to improve the accuracy of the laser projection. The system may automatically perform the range-finding function when the find-targets function is used in auto-alignment mode. In manual mode or in semi-auto mode, the operator must perform the range finding. At step 1274 when the operator selects to perform the range-finding function, the range-finding sequence is begun at step 1276. In manual mode, the operator either puts the laser beam to the target on which range-finding will be performed or the operator may simply select the target through the operator interface and let the system physically find the operator-chosen target and perform the range-finding function.

Figure 23:
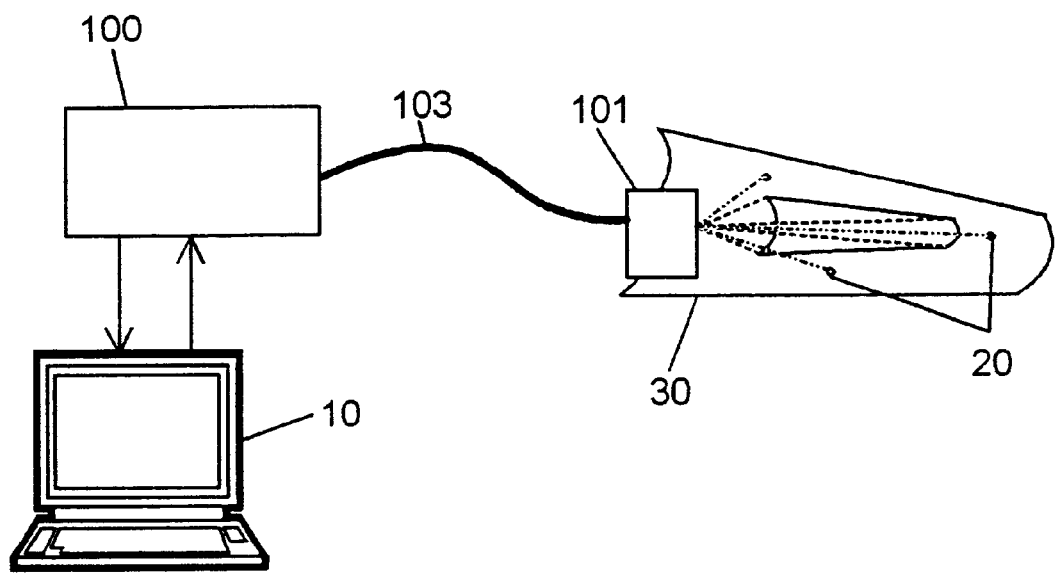
FIG. 23 is a perspective view of a second embodiment of the present invention.

Another feature of the present invention is that the projector 100 may be separated into a two-component arrangement as illustrated in FIG. 23. The two-component arrangement is provided where the laser projection components are grouped into a much smaller, more compact laser component unit 101 connected to a processing component unit 102 containing the heat generating components of the system. Laser component unit 101 is connected to processing component unit 102 by an electrical/electronic umbilical cord 103. A typical size for laser component unit 101 is about 7 inches long by about 2.5 inches high by about 3.6 inches wide. This allows the use of the projection system in relatively small areas where larger projector systems cannot be used. Further, laser component unit 101 does not need a cooling system to remove heat from inside the unit.

Figure 24:
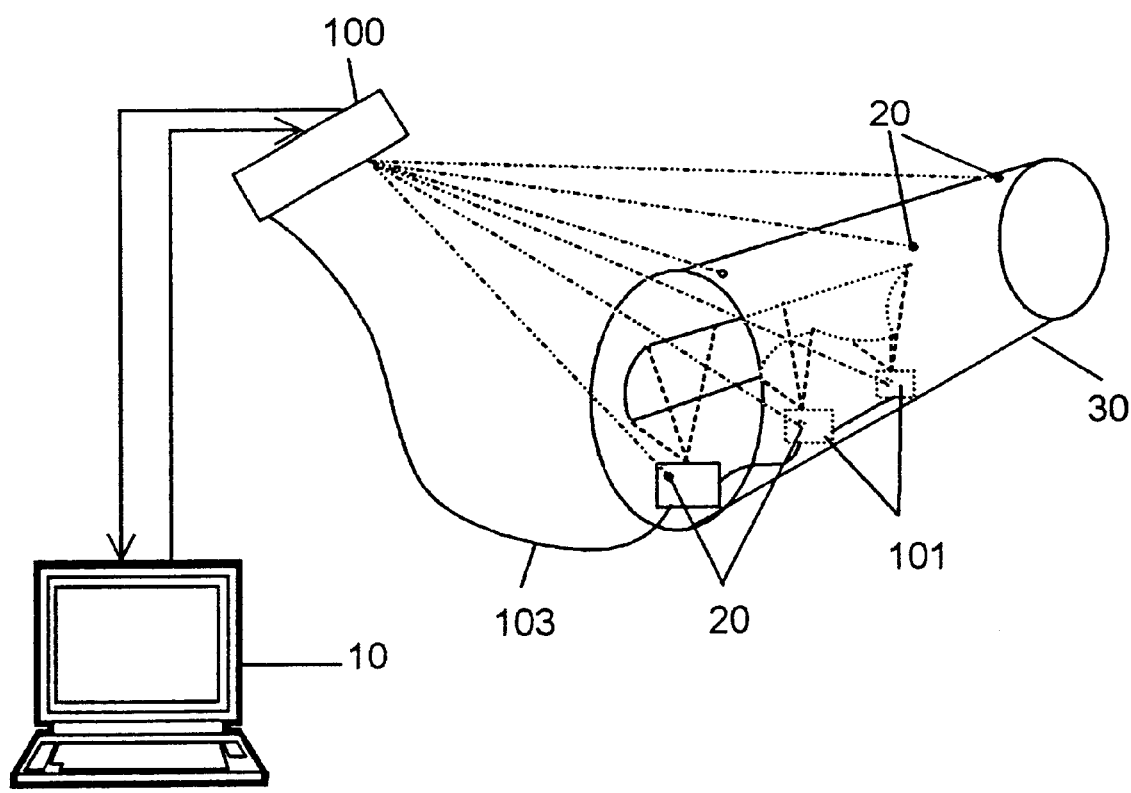
FIG. 24 is a perspective view of a third embodiment of the present invention.

An additional key feature of the present invention is the ability for the system to be composed of a master projector 100 and a plurality of satellite projectors 101 illustrated in FIG. 24. Each satellite projector 101 would possess a retro-reflective target 20. In this embodiment, the location of satellite projectors 101 would be determined as a set of 3-D projector coordinates whose coordinates along with each projectors yaw, pitch and roll can be used in another set of algorithms derived from the coordinates and yaw, pitch and roll of master projector 100 relative to the world/tool coordinate system. Such a system allows the projection of tool templates in locations on the tool that cannot be seen by master projector 100. For instance, if a particular tool has a major surface on which various templates must be projected but also has an inside portion upon which additional templates must be projected, such an embodiment of the present invention would allow laser projection onto all of the surfaces of a tool that require laser projected templates. These other embodiments are all based on the projectors ability to determine each projector's distance from the surface of the tool by performing laser range finding of retro-reflective surfaces.

The present invention combines a measurement system with a laser to project data defining part outlines, i.e. templates, onto a structure. Unlike prior art devices, the present invention does not need to assume the relative position between projector 100 and object 30. In all prior art devices, the computation for 3-D projection involves a basic algorithm for computing the relationship between the projector galvanometers 164 and 168. The algorithm involves a distance factor d that is the distance from the galvanometer to the surface being projected upon. However, this factor is assumed or must be removed from the equations. Using only three reference points gives rise to the possible divergence in the solutions to the prior art algorithms. A consequence of this possibility is the requirement of six reference points to perform the necessary least squares analysis in order to obtain the accuracy required to project the 3-D image and to insure that the solution converges. The present invention measures the "d" factor, i.e. the distance to at least one reference point on the reference target. Preferably, the distance to three reference points are measured to increase the accuracy of the projection. Because the present invention measures the distance to at least one reference point, the solution to the algorithms will always converge.

The movement of the projector galvanometers to project a line actually causes arching of a line between two points. Another unique feature of the present invention is the method presented for making a laser project a straight line between two points. This is accomplished by using a method that divides the straight line in 3-D into variable intervals.

The basic algorithms used to project a 3-D laser image will now be discussed. To properly project a 3-D laser image onto an object, a system of equations relating the world (tool) frame and the projector frame must be used. This is called a coordinate system transform. Below are the linear equations that correspond to the transform from the World (Tool) frame to the Projector Frame:

$$\begin{cases} s = x_P = m_{11} \cdot (x - PX) + m_{12} \cdot (y - PY) + m_{13} \cdot (z - PZ) \\ u = y_P = m_{21} \cdot (x - PX) + m_{22} \cdot (y - PY) + m_{23} \cdot (z - PZ) \\ t = z_P = m_{31} \cdot (x - PX) + m_{32} \cdot (y - PY) + m_{33} \cdot (z - PZ) \end{cases} \quad \text{Eq. 1}$$

Where: x, y, z are coordinates of any given point (A) in the World Frame.
PX, PY, PZ are coordinates of the projector origin in the World Frame.
$x_P$, $y_P$, $z_P$, are coordinates of any given point (A) in the Projector Frame.
$m_{ij}$ are coefficients of Rotation Matrix (see below).
s, u, t are assigned instead of $x_P$, $y_P$, $z_P$, for making further notations more readable.
The coefficients of Rotation Matrix are:

$$\begin{cases} m_{11} = \cos\varphi \cdot \cos\kappa \\ m_{12} = \sin\omega \cdot \sin\varphi \cdot \cos\kappa + \cos\omega \cdot \sin\kappa \\ m_{13} = -\cos\omega \cdot \sin\varphi \cdot \cos\kappa + \sin\omega \cdot \sin\kappa \\ m_{21} = -\cos\varphi \cdot \sin\kappa \\ m_{22} = -\sin\omega \cdot \sin\varphi \cdot \sin\kappa + \cos\omega \cdot \cos\kappa \\ m_{23} = \cos\omega \cdot \sin\varphi \cdot \sin\kappa + \sin\omega \cdot \cos\kappa \\ m_{31} = \sin\varphi \\ m_{32} = -\sin\omega \cdot \cos\varphi \\ m_{33} = \cos\omega \cdot \cos\varphi \end{cases} \quad \text{Eq. 2}$$

Where: ω=ROLL, which is projector rotation around the axis parallel to the X axis of the World Frame.
Φ=PITCH, which is projector rotation around once rotated y axis.
κ=YAW, which is projector rotation around twice rotated z axis.
Positive rotation angle is counterclockwise when looking from the positive end of the respective axis.
The projector beam steering equations for the galvanometers for the case with no orthogonality correction are:

$$\begin{vmatrix} \tan(V) = \dfrac{u}{t} = \dfrac{m_{21} \cdot (x - PX) + m_{22} \cdot (y - PY) + m_{23} \cdot (z - PZ)}{m_{31} \cdot (x - PX) + m_{32} \cdot (y - PY) + m_{33} \cdot (z - PZ)} \\ \tan(H) = \dfrac{s \cdot \cos(V)}{e \cdot \cos(V) - t} = \dfrac{\begin{array}{l}(m_{11} \cdot (x - PX) + m_{12} \cdot (y - PY) + \\ m_{13} \cdot (z - PZ))\end{array}}{\begin{array}{l}e \cdot \cos V - (m_{31} \cdot (x - PX) + \\ m_{32} \cdot (y - PY) + m_{33} \cdot (z - PZ))\end{array}} \end{vmatrix} \quad \text{Eq. 3}$$

Where:
V is the vertical beam steering angle corresponding axis $y_P$ of the Projector Frame(radians, optical).
H is the horizontal beam steering angle corresponding axis $x_P$ of the Projector Frame(radians, optical).
e is the separation distance between two beam steering mirrors.

For the system to project properly, Equation 3 is used in two processes. First, projector virtual alignment is determined, which includes finding six projector location parameters a), ω, Φ, κ, PX, PY, PZ by measuring beam steering angles H and V for at least three reference targets with known positions x, y, z in the World Frame. The second process involves projecting an actual template while steering the beam with computing angles H and V based on known projector location parameters ω, Φ, κ, PX, PY, PZ, and known template points x, y, z in the World frame.

The first process requires solving a system of at least six non-linear equations represented by Eq. 3a that are, in fact, a repeated superset of Equation 3.

$$\tan(V_1) = -\frac{u_1}{t_1} = -\frac{\begin{array}{l}m_{21} \cdot (x_1 - PX) + m_{22} \cdot (y_1 - PY) + \\ m_{23} \cdot (z_1 - PZ)\end{array}}{\begin{array}{l}m_{31} \cdot (x_1 - PX) + m_{32} \cdot (y_1 - PZ) + \\ m_{33} \cdot (z_1 - PZ)\end{array}} \quad \text{Eq. 3a}$$

$$\tan(H_1) = \frac{s_1 \cdot \cos(V_1)}{e \cdot \cos(V_1) - t_1} = \frac{\begin{array}{l}(m_{11} \cdot (x_1 - PX) + m_{12} \cdot (y_1 - PY) + \\ m_{13} \cdot (z_1 - PZ)) \cdot \cos(V_1)\end{array}}{\begin{array}{l}e \cdot \cos(V_1) - (m_{31} \cdot (x_1 - PX) + \\ m_{32} \cdot (y_1 - PY) + m_{33} \cdot (z_1 - PZ))\end{array}}$$

$$\tan(V_2) = -\frac{u_2}{t_2} = -\frac{\begin{array}{l}m_{21} \cdot (x_2 - PX) + m_{22} \cdot (y_2 - PY) + \\ m_{23} \cdot (z_2 - PZ)\end{array}}{\begin{array}{l}m_{31} \cdot (x_2 - PX) + m_{32} \cdot (y_2 - PZ) + \\ m_{33} \cdot (z_2 - PZ)\end{array}}$$

$$\tan(H_2) = \frac{s_2 \cdot \cos(V_2)}{e \cdot \cos(V_2) - t_2} = \frac{\begin{array}{l}(m_{11} \cdot (x_2 - PX) + m_{12} \cdot (y_2 - PY) + \\ m_{13} \cdot (z_2 - PZ)) \cdot \cos(V_2)\end{array}}{\begin{array}{l}e \cdot \cos(V_2) - (m_{31} \cdot (x_2 - PX) + \\ m_{32} \cdot (y_2 - PY) + m_{33} \cdot (z_2 - PZ))\end{array}}$$

$$\tan(V_3) = -\frac{u_3}{t_3} = -\frac{\begin{array}{l}m_{21} \cdot (x_3 - PX) + m_{22} \cdot (y_3 - PY) + \\ m_{23} \cdot (z_3 - PZ)\end{array}}{\begin{array}{l}m_{31} \cdot (x_3 - PX) + m_{32} \cdot (y_3 - PZ) + \\ m_{33} \cdot (z_3 - PZ)\end{array}}$$

$$\tan(H_3) = \frac{s_3 \cdot \cos(V_3)}{e \cdot \cos(V_3) - t_3} = \frac{\begin{array}{l}(m_{11} \cdot (x_3 - PX) + m_{12} \cdot (y_3 - PY) + \\ m_{13} \cdot (z_3 - PZ)) \cdot \cos(V_3)\end{array}}{\begin{array}{l}e \cdot \cos(V_3) - (m_{31} \cdot (x_3 - PX) + \\ m_{32} \cdot (y_3 - PY) + m_{33} \cdot (z_3 - PZ))\end{array}}$$

For more than three targets, Equation 3a will have more equations but the same six unknowns (ω, Φ, κ, PX, PY, PZ), e.g. the system will become over-determined. However, in practice six reference points are used because there are point locations that would cause solution divergence if only three reference points are used. Using six points reduces the likelihood that a diverging solution will occur.

The second process involves the direct computation of tan(H) and tan(V) using formulas in Equation 3 for each projecting point and then finding the arctangents.

In order to solve Equation 3a, they must be linearized. Linearization is described below using as an example the system represented by Eq. 3.

Equation 3 is linearized following Taylor's Theorem and building the following auxiliary functions:

$$F = t \cdot \tan(V) + u = 0$$

$$G = e \cdot \cos(V) \cdot \tan(H) - t \cdot \tan(H) \cdot s \cdot \cos(V) = 0 \quad \text{Eq. 4}$$

According to Taylor's Theorem:

$$(F)_0 + \left(\frac{\partial F}{\partial \omega}\right)_0 \cdot d\omega + \left(\frac{\partial F}{\partial \varphi}\right)_0 \cdot d\varphi + \left(\frac{\partial F}{\partial \kappa}\right)_0 \cdot d\kappa + \quad \text{Eq. 5.1}$$

$$\left(\frac{\partial F}{\partial PX}\right)_0 \cdot dPX + \left(\frac{\partial F}{\partial PY}\right)_0 \cdot dPY + \left(\frac{\partial F}{\partial PZ}\right)_0 \cdot dPZ = 0$$

-continued $$(G)_0 + \left(\frac{\partial G}{\partial \omega}\right)_0 \cdot d\omega + \left(\frac{\partial G}{\partial \varphi}\right)_0 \cdot d\varphi + \left(\frac{\partial G}{\partial \kappa}\right)_0 \cdot d\kappa +$$
$$\left(\frac{\partial G}{\partial PX}\right)_0 \cdot dPX + \left(\frac{\partial G}{\partial PY}\right)_0 \cdot dPY + \left(\frac{\partial G}{\partial PZ}\right)_0 \cdot dPZ = 0 \quad \text{Eq. 5.2}$$

Where:
 $(F)_0$ and $(G)_0$ are functions from expressions in Eq. 4 evaluated at initial approximations for the six unknowns ($\omega_0$, $\Phi_0$, $\kappa_0$, $PX_0$, $PY_0$, $PZ_0$),
 terms $(\partial F/\partial \omega)_0$, etc., are partial derivatives of the functions F and G with respect to indicated unknowns evaluated at the initial approximations,
 $d\omega$, $d\Phi$, etc., are unknown corrections to be applied to the initial approximations.

Equations 5.1 and 5.2 are actually linear equations with respect to the unknown corrections:

$$\begin{cases} a_{11} \cdot d\omega + a_{12} \cdot d\varphi + a_{13} \cdot d\kappa + a_{14} \cdot dPX + \\ \quad a_{15} \cdot dPY + a_{16} \cdot dPZ + b_1 = 0 \\ a_{21} \cdot d\omega + a_{22} \cdot d\varphi + a_{23} \cdot d\kappa + a_{24} \cdot dPX + \\ \quad a_{25} \cdot dPY + a_{26} \cdot dPZ + b_2 = 0 \end{cases} \quad \text{Eq. 6}$$

Where: $b_1 = (F)_0$ $a_{11} = (\partial F/\partial \omega)_0$, $a_{12} = (\partial F/\partial \Phi)_0$, $a_{13} = (\partial F/\partial \kappa)_0$, $a_{14} = (\partial F/\partial PX)_0$, $a_{15} = (\partial F/\partial PY)_0$, $a_{16} = (\partial F/\partial Z)_0$, Eq. 6a $b_2 = (G)_0$ $a_{21} = (\partial G/\partial \omega)_0$, $a_{22} = (\partial G/\partial \Phi)_0$, $a_{23} = (\partial G/\partial \kappa)_0$, $a_{24} = (\partial G/\partial PX)_0$, $a_{25} = (\partial G/\partial PY)_0$, $a_{26} = (\partial G/\partial PZ)_0$, Eq. 6b If n reference targets are used, then there are going to be 2n linear equations. Those equations, illustrated by Eq. 7, will be a superset of Eq. 6 in the same way Eq. 4a are the superset of Eq. 4.

$$\begin{cases} a_{11} \cdot d\omega + a_{12} \cdot d\varphi + a_{13} \cdot d\kappa + a_{14} \cdot dPX + \\ a_{15} \cdot dPY + a_{16} \cdot dPZ + b_1 = 0 \\ a_{21} \cdot d\omega + a_{22} \cdot d\varphi + a_{23} \cdot d\kappa + a_{24} \cdot dPX + \\ a_{25} \cdot dPY + a_{26} \cdot dPZ + b_2 = 0 \\ \hline a_{2n-1,1} \cdot d\omega + a_{2n-1,2} \cdot d\varphi + a_{2n-1,3} \cdot d\kappa + a_{2n-1,4} \cdot dPX + \\ a_{2n-1,5} \cdot dPY + a_{2n-1,6} \cdot dPZ + b_{2n-1} = 0 \\ a_{2n,1} \cdot d\omega + a_{2n,2} \cdot d\varphi + a_{2n,3} \cdot d\kappa + a_{2n,4} \cdot dPX + a_{2n,5} \cdot dPY + \\ a_{2n,6} \cdot dPZ + b_{2n} = 0 \end{cases} \quad \text{Eq. 7}$$

The system of equations represented by Eq. 7 is overdetermined and has to be solved using the Least Square Method. As soon as Eq. 7 are solved and if the corrections found are not small enough, new approximations for $\omega$, $\Phi$, $\kappa$, PX, PY, PZ are computed:

$\omega_1 = \omega_0 + d\omega$;

$\Phi_1 = \Phi_0 + d\Phi$;

$\kappa_1 = \kappa_0 + d\kappa$;

$PX_1 = PX_0 + dPX$;

$PY_1 = PY_0 + dPY$;

$PZ_1 = PZ_0 + dPZ$;

Functions F and G and their derivatives are evaluated with these new approximations. A new system of equations are composed, which look the same as those in Eq. 7. The new system of equations has terms computed using the same formulas as shown in Eqs. 5.1 and 5.2 but only evaluated for that new step. After solving for the new system of equations, we again estimate corrections found, compose and solve a next system of equations and so forth, until corrections become less than a specified tolerance. In fact, the system of non-linear equations is being solved by linearizing them by way of the iterative converging process of solving a sequence of linear systems.

It is apparent that in the sequence of linear systems all terms of odd equations according to Eq. 6a can be calculated by substituting "generic" positions x, y, z with target positions $x_1$, $y_1$, $z_1$, then $x_2$, $y_2$, $z_2$, etc. and by evaluating Eq. 6a for the current iterative step k of approximation. The same process can be used to calculate all terms of even equations based on Eq. 6b.

Thus, it is enough to figure out "generic" formulas for all terms of equations (Eq. 6) to be able to program a computational engine for the iterative solving of system equations for k approximations.

By measuring the distance to the reference point and incorporating the distance measurement in the calculations, a system can be solved using only three reference points where at least the distance to one reference point is measured. The distance measurement gives stability to the projector equations for tan(H) and tan(V) and also prevents the equations for tan(H) and tan(V) from diverging under certain conditions such as when the reference point is directly below the projector, i.e. at the center of the laser projector field of view. Unlike prior art laser projection systems that do not measure distance between the projector and the reference object/target, the distance measurement of the present invention eliminates the need to use six reference points in order to reduce the probability of obtaining a diverging solution when only three reference points are used.

To include the distance measurement in the system equations, the basic formula is based on the geometric relationship of a right triangle $d^2 = x^2 + y^2$. The following equation is developed for measuring distance from the x-mirror and using x-y-z coordinates from the y-mirror. Using the basic algorithm for computing the relationship between the projector galvanometers and the projection surface for 3-D projection, the distance equation obtained is:

$$D^2 = X_p^2 + \left(e - \frac{Z_p}{\cos(V)}\right)^2 \quad \text{Eq. 8}$$

Where
 D is the distance from the X mirror.
 $X_p$ is the X-coordinate of point p in Projector Frame e is the distance between the galvanometers.

$-Z_p/\cos(V)$ is based on the x, y and z coordinates of the Y mirror.

By substituting the $X_P$ and $Z_P$ for the s and t of Eq. 1 based on Y-mirror coordinates, the distance equation now is:

$$D^2 \cdot [\cos(V)]^2 = [s \cdot \cos(V)]^2 + [e \cdot \cos(v) - t]^2 \qquad \text{Eq. 9}$$

As previously done with the beam steering equations, the distance equation is linearized using a Taylor series to form an auxiliary function E.

Accordingly, $$E = s^2 \cdot \cos^2(V) + (e \cdot \cos(V) - t)^2 - D^2 \cdot \cos^2(V) \qquad \text{Eq. 10}$$

According to Taylor's Theorem:

$$(E)_0 + \left(\frac{\partial E}{\partial \omega}\right)_0 d\omega + \left(\frac{\partial E}{\partial \varphi}\right)_0 d\varphi + \left(\frac{\partial E}{\partial \kappa}\right)_0 d\kappa + \qquad \text{Eq. 11}$$
$$\left(\frac{\partial E}{\partial PX}\right)_0 dPX + \left(\frac{\partial E}{\partial PY}\right)_0 dPY + \left(\frac{\partial E}{\partial PZ}\right)_0 dPZ = 0$$

Where:
  $(E)_0$ is a function from the expression in Eq. 10 evaluated at initial approximations for the six unknowns ($\omega_0$, $\Phi_0$, $\kappa_0$, $PX_0$, $PY_0$, $PZ_0$),
  terms $(\partial E/\partial \omega)_0$, etc. are partial derivatives of the function E with respect to indicated unknowns evaluated at the initial approximations,
  $d\omega$, $d\Phi$, etc., are unknown corrections to be applied to the initial approximations.

Equation 11 is actually a linear equation with respect to the unknown corrections:

$$a_{31} \cdot d\omega + a_{32} \cdot d\Phi + a_{33} \cdot d\kappa + a_{34} \cdot dPX + a_{35} \cdot dPY + a_{36} \cdot dPZ + b_3 = 0 \qquad \text{Eq. 12}$$

Where:
  $b_3 = E$
  $a_{31} = (\partial E/\partial \omega)_0$,
  $a_{32} = (\partial E/\partial \Phi)_0$,
  $a_{33} = (\partial E/\partial \kappa)_0$,
  $a_{34} = (\partial E/\partial PX)_0$,
  $a_{35} = (\partial E/\partial PY)_0$,
  $a_{36} = (\partial E/\partial PZ)_0$, Eq. 11 combined with the beam steering equations (Eq. 3) previously discussed provides a system where the distance from the projector to the object is measured. If three reference targets are used for determining distance, then there are going to be three linear equations (Eq. 3 plus Eq. 11). Thus if n targets are measured then there are going to be 3n linear equations. Those equations will be a superset of Eq. 3 and Eq. 11. Solving the equations involve mathematical manipulations and substitutions, which someone skilled in the art is capable of performing. Thus, these further equations are not shown here. By incorporating the distance measurement in the system algorithms, there is prevented the accidental choice of a reference target that causes the equations to diverge instead of converge. Also by measuring the distance, there is no need to use more than three reference points to obtain system stability and accuracy.

Another important feature of the present invention is the method developed to project the laser beam. To cause projector 100 to project a straight line between two reference points, the system divides a straight line in 3-D into variable intervals. Further, projecting a piece of a straight line in 3-D space by steering a laser beam involves generating a series of galvanometer position commands to implement a proper motion control velocity profile. To implement a proper motion control velocity profile involves dividing a straight line in 3-D into variable intervals.

According to Analytical Geometry, if a piece of line is divided with some aspect ratio then its projections on coordinate axes are divided with the same aspect ratio. For example, in 2-D space if you divide a piece of line by half, its projections are also divided by half. The same remains true for 3D space. Thus, any sequence of filling points can be generated by generating proportional sequences of points for each line axial projection.

The solution described below is applicable to a piece of line ($P_1$ $P_2$) specified in the world (tool) frame.

First, scaled Initial Intervals are computed:

$$I_0 x = (x_2 - x_1)/N, \qquad \text{Eq. 13}$$

$$I_0 y = (y_2 - y_1)/N, \qquad \text{Eq. 14}$$

$$I_0 z = (z_2 - z_1)/N, \qquad \text{Eq. 15}$$

Where:
  $I_0 x$, $I_0 y$, $I_0 z$ are projections of the Initial Interval $I_0$ onto coordinate axes.
  $x_1$, $y_1$, $z_1$, are coordinates of the beginning of the line being filled.
  $x_2$, $Y_2$, $z_2$, are coordinates at the end of that line.
  N is a constant and equals the number of points filling the line uniformly with intervals equal to the initial interval $I_0$.

Second, Scale Functions (Interval Multipliers) are specified.

The variable filling interval is defined as a function of the relative distance from the initial point $P_1$ and is represented by the function:

$$F_{scale} = F(p/\Delta L), \qquad \text{Eq. 16}$$

Where:
  $\Delta L$ is the full length of the piece of line in 3D space, i.e. $\Delta L = (P_1\ P_2)$.
  p is the variable absolute distance from the point $P_1$.
cEq. 16 is defined on the interval $(0, \Delta L)$.
The variable interval I can be expressed by the formula:

$$I = I_0 * F_{scale} = I_0 * F(p/\Delta L), \qquad \text{Eq. 17}$$

In order to match Eq. 17 with the definition of the initial interval Eqs. 13–15 we presume $F(0) = 1$.

In accordance with the aspect ratio described earlier, the interval multiplier has to be the same for all three axes, x, y and z. Thus:

$$F(p/\Delta L) = F\ (p_x/\Delta X) = F(p_y/\Delta Y) = F(p_z/\Delta Z), \qquad \text{Eq. 18}$$

Where:
  $p_x$, $p_y$, $p_z$ are projections of the variable distance p.
  $\Delta X$, $\Delta Y$, $\Delta Z$ are projections of the full length $\Delta L$.
Eq. 18 can be rewritten as:

$$F(I/\Delta L) = F(x - x_1/x_2 - x_1) = F(y - y_1/y_2 - y_1) = F(z - z_1/z_2 - z_1), \qquad \text{Eq. 19}$$

Function F can be continuous or segmented.

The following is an example of the segmented function F. Assume that the line is 100 mm long in 3D space and that you wish to fill the last 25 mm of the line with intervals five times smaller than the first 75 mm of the line. The scale function $F(x)$ for the X axis will be:

$$F(x) = \begin{cases} 1, \text{ when } 0 \le \frac{x-x_1}{x_2-x_1} < \frac{3}{4} \\ \frac{1}{5}, \text{ when } \frac{3}{4} \le \frac{x-x_1}{x_2-x_1} < 1 \end{cases} \quad \text{Eq. 20}$$

Substituting x with y or z in the above expression, you get scale functions F(y) and F(z).

An array of fill points q(k) for the x-axis, y-axis and z-axis can be created using the following example of C code by substituting m with x, y and z in the code.

q=q1;
k=0;
q(0)=q;

while ((q<x2)&&(q>=x1))

{q=q+I0*F(q);
k=k+1;
q(k)=q; }

Projecting a piece of straight line in 3D space by steering the laser beam involves generating a series of galvanometer position commands to implement a proper motion control velocity profile. Unlike the discussion above that considered given intervals in length, servo commands usually are generated over the given fixed time intervals (ticks).

As an example, a trapezoidal velocity profile is used. It should be understood that other profiles may be used and their subsequent equations determined. To project a straight line between points $P_1$ and $P_2$, you assume that you have computed coordinates of those points in the projector frame $(x_{P1}, y_{P1}, z_{P1}$ and $x_{P2}, y_{P2}, z_{P2})$ by using coordinate transform as well as the associated horizontal and vertical beam steering angles, i.e. galvanometer angles, ($H_1$, $H_2$ and $V_1$, $V_2$). You begin by figuring out proper trapezoidal profiles for the H and V galvanometers separately. Each galvanometer has acceleration and velocity limits. Trapezoidal velocity profiles can be computed based on those limits and on the angular travel distance $\Delta H = H_2 - H_1$ and $\Delta V = V_2 - V_1$.

The following is an algorithm to create a symmetrical trapezoidal velocity profile for linear travel. Calculate the maximum distance achievable with maximum constant acceleration a until the velocity limit $v_{lim}$ will be reached:

$$S_{max} = \frac{v_{lim}^2}{2 \cdot a} \quad \text{Eq. 21}$$

Compare the maximum distance with the half of the distance to travel $\Delta L/2$. If $\Delta L/2 <= S_{max}$, then it is going to be triangular velocity profile with the maximum velocity achieved at the center of the travel:

$$v_{max} = \sqrt{a \cdot \Delta L} \quad \text{Eq. 22}$$

Compute triangular velocity profile parameters. Such a triangular velocity profile consists of two segments only, an acceleration segment and a deceleration segment. In the acceleration segment, its length $S_a$ and duration $t_a$ are given by:

$$S_a = \frac{v_{max}^2}{2 \cdot a} \quad \text{Eq. 23}$$

$$t_a = \frac{v_{max}}{a} \quad \text{Eq. 24}$$

In the deceleration segment, its length $S_d$ and duration $t_d$ are equal to $S_a$ and $t_a$. However, if $\Delta L/2 > S_{max}$, then the velocity profile will be a trapezoidal velocity Profile with the maximum velocity achieved at the end of the acceleration segment to be equal to $v_{lim}$.

To compute the trapezoidal velocity profile parameters, the trapezoidal velocity profiles will consist of three segments, an acceleration segment, a constant velocity segment and a deceleration segment. In the acceleration segment, its length $S_a$ and duration $t_a$ can be computed by substituting $v_{lim}$ instead of $v_{max}$ into Eqs. 23 and 24. In the constant velocity ($v_{lim}$) segment, its length $S_c$ and duration $t_c$ are given by:

$$S_c = \Delta L - 2 \cdot S_a \quad \text{Eq. 25}$$

$$t_c = \frac{S_c}{v_{lim}} \quad \text{Eq. 26}$$

In the deceleration segment, its length $S_d$ and duration $t_d$ are equal to $S_a$ and $t_a$. The complete duration of the travel $\Delta L$ is given by:

$$T = t_a + t_c + t_d \quad \text{Eq. 27}$$

Equations 21 to 27 can be used to compute trapezoidal velocity profiles for galvanometers by replacing linear distances, velocities and accelerations with angular values. So, $\Delta L$ should be substituted by $\Delta H$ or $\Delta V$, and $S_a$, $S_c$, and $S_d$ will be replaced with $H_a$, $H_c$ and $H_d$ or with $V_a$, $V_c$ and $V_d$.

After finding the trapezoidal velocity profiles for the H and V galvanometers, the velocity profile that has longer the travel time T is selected. The reason that the velocity profile with the longer travel time is chosen is that it is slower and, thus, should dictate the pace of motion. Assuming that the slower velocity profile is the V galvanometer, the relative segment distances are computed:

$$R_a = V_a/\Delta V, \quad \text{Eq. 28}$$

$$R_c = V_c/\Delta V, \quad \text{Eq. 29}$$

$$R_d = V_d/\Delta V, \quad \text{Eq. 30}$$

Where the slower velocity profile is the H galvanometer, the following formulas are used:

$$R_a = H_a/\Delta H, \quad \text{Eq. 31}$$

$$R_c = H_c/\Delta H, \quad \text{Eq. 32}$$

$$R_d = H_d/\Delta H, \quad \text{Eq. 33}$$

In reality, the beam steering angles H and V are related to the point position $(x_P, y_P, z_P)$ in the projector frame by way of non-linear equations, previously described by Eq. 3.

$$\begin{cases} \tan(V) = -\frac{y_P}{z_P} \\ \tan(H) = \frac{x_P \cdot \cos(V)}{e \cdot \cos(V) - z_P} \end{cases} \quad \text{Eq. 34}$$

Despite the actual non-linearity of Eq. 34, approximations are used because the distances along axes $x_P$ and $y_P$ are proportional to the corresponding beam steering angles H and V. This allows the trapezoidal profile parameters that are valid to project the straight line ($P_1$ $P_2$) to be computed. The projected setpoints for the axes $x_P$, $y_P$ and $z_P$ are then calculated. Finally, the real setpoints for the galvanometers H and V using Equation 34 are computed. Because of non-linearity of Eq. 34, the resulting servo motion velocity profiles for the galvanometers will be neither precisely trapezoidal nor will they have precisely maximum velocities and accelerations expected from the initially defined angular segments $H_a$, $H_c$ and $H_d$ or $V_a$, $V_c$ and $V_d$. Nevertheless, the projected line will be precisely straight. For most practical applications, the acceleration and velocity errors do not exceed ±10%. Based on the principle of proportionality between projections (see Equations 18 and 19, and as previously discussed) then:

$$R_a = x_a/|x_{P2}-x_{P1}| = y_a/|y_{P2}-y_{P1}| = z_a/|z_{P2}-z_{P1}| \quad \text{Eq. 37}$$

$$R_c = x_c/|x_{P2}-x_{P1}| = y_c/|y_{P2}-y_{P1}| = z_c/|z_{P2}-z_{P1}| \quad \text{Eq. 38}$$

$$R_d = x_d/|x_{P2}-x_{P1}| = y_d/|y_{P2}-y_{P1}| = z_d/|z_{P2}-z_{P1}| \quad \text{Eq. 39}$$

Where: $x_a$, $x_c$, $x_d$, $y_a$, $y_c$, $y_d$, $z_a$, $z_c$, and $z_d$ are projected components of trapezoidal profile segments.

Where the relative segment distances from Equations 28 to 30 or from Equations 31 to 33 are known, the length of each of the projected components are:

$$x_{a,c,d} = R_{a,c,d} \cdot (x_{P2}-x_{P1}) \quad \text{Eq. 40}$$

$$y_{a,c,d} = R_{a,c,d} \cdot (y_{P2}-y_{P1}) \quad \text{Eq. 41}$$

$$z_{a,c,d} = R_{a,c,d} \cdot (z_{P2}-x_{P1}) \quad \text{Eq. 42}$$

Projected accelerations and projected maximum velocity are calculated:

$$\left. \begin{array}{l} a_x = \dfrac{2 \cdot x_{a,c,d}}{t_a^2} \\ a_y = \dfrac{2 \cdot y_{a,c,d}}{t_a^2} \\ a_z = \dfrac{2 \cdot z_{a,c,d}}{t_a^2} \end{array} \right| \quad \text{Eq. 43}$$

$$\left. \begin{array}{l} v_{x\,max} = a_x \cdot t_a, \\ v_{y\,max} = a_y \cdot t_a \\ v_{z\,max} = a_z \cdot t_a, \end{array} \right| \quad \text{Eq. 44}$$

From the above, projected setpoints (i=0,1,2 . . . ) for the given time interval $\tau$ are generated for x, y and z. The equations for the x values are shown. By substituting y and z for x, the y and z equations would be similar:

$$x_P(i \cdot \tau) = \begin{cases} x_{P1} + \dfrac{a_x}{2} \cdot (i \cdot \tau)^2, & \text{when } (i \cdot \tau) \le t_a \\ x_{P1} + \dfrac{a_x}{2} \cdot t_a^2 + v_{x\,max} \cdot (i \cdot \tau - t_a), & \text{when } t_a < (i \cdot \tau) \le t_a + t_c \\ x_{P1} + \dfrac{a_x}{2} \cdot t_a^2 + v_{x\,max} \cdot t_c + v_{x\,max} \cdot (i \cdot \tau - t_a - t_c) - \\ \dfrac{a_x}{2} \cdot (i \cdot \tau - t_a - t_c)^2, & \text{when } t_a + t_c < (i \cdot \tau) \le T \\ x_{P2}, & \text{when } (i \cdot \tau) > T \end{cases} \quad \text{Eq. 45}$$

Finally, the real setpoints for the galvanometers are computed by substituting projected setpoints (Equation 45 for x, y and z) into the Equation 34:

$$V(i \cdot \tau) = -\arctan\left(\frac{y_p(i \cdot \tau)}{z_p(i \cdot \tau)}\right) \quad \text{Eq. 46}$$

$$H(i \cdot \tau) = \arctan\left(\frac{x_p(i \cdot \tau) \cdot \cos(V(i \cdot \tau))}{e \cdot \cos(V(i \cdot \tau)) - z_p(i \cdot \tau)}\right) \quad \text{Eq. 47}$$

Although the preferred embodiments of the present invention have been described herein, the above descriptions are merely illustrative. Further modification of the invention herein disclosed will occur to those skilled in the respective arts and all such modifications are deemed to be within the scope of the invention as defined by the appended claims.

What is claimed is:

1. A laser projection system comprising:
   a laser projection optics module having a light emitting component capable of emitting a laser beam, a focusing assembly for focusing said laser beam at some distance from said optics module, a two-axis beam steering mechanism capable of rapidly directing said laser beam over a defined surface, and a photo optic feedback component that receives said laser light reflected from said defined surface;
   a timing module coupled to said optic feedback component to determine the elapsed travel time of said laser light traveling from said light emitting component to said photo optic feedback component;
   a controller module coupled to said optics module and said timing module; and
   a power module coupled to said optics module, said timing module and said controller module.

2. The projection system of claim 1 further comprising a data storage unit connected to said controller module wherein said data storage unit contains a program for controlling said controller module, said controller module operative with said program to control said optics module and said timing module.

3. The projection system of claim 1 further comprising a cooling system connected to said power module.

4. The projection system of claim 1 wherein said light emitting component has an astigmatism-correcting prism.

5. The projection system of claim 1 wherein said light emitting component has one or more collimating lenses.

6. The projection system of claim 1 wherein said focusing assembly comprising one or more focusing lenses and a linear actuator connected to said one or more focusing lenses.

7. The projection system of claim 6 wherein said focusing assembly is motorized.

8. The projection system of claim 7 wherein said focusing assembly comprising at least one limit sensor for limiting the movement of said one or more focusing lenses.

9. The projection system of claim 1 wherein said beam steering mechanism comprising two servo galvanometers wherein each of said two galvanometers has a coupling shaft and a reflective optical element attached to said coupling shaft.

10. The projection system of claim 1 wherein said photo optic feedback component comprising a photo optic sensor, a band pass filter coupled to said optic sensor and an adjustable reflective element coupled to said band pass filter and said optic sensor.

11. The projection system of claim 10 wherein said reflective element is orthogonal to said laser beam.

12. The projection system of claim 1 wherein said timing module is a high-speed chronometer.

13. The projection system of claim 1 wherein said controller module comprising a microprocessor, a random access memory module coupled to said microprocessor, a read-only memory module coupled to said microprocessor, and a clock module coupled to said microprocessor.

14. The projection system of claim 1 wherein said power module comprising an AC input power module and one or more DC output modules.

15. The projection system of claim 3 wherein said cooling system comprising a heat exchanger component and at least one fan.

16. The projection system of claim 15 wherein said heat exchanger component has cooling fins.

17. The projection system of claim 15 wherein said heat exchanger component is one or more thermoelectric devices.

18. A laser projector comprising:
   means for projecting a laser beam at a retro-reflective target on an object;
   means for receiving a reflected portion of said laser beam from said retro-reflective target;
   means for measuring the time of flight of said laser beam;
   means for determining the spatial position of said laser projector to said retro-reflective target using said time of flight; and
   means for projecting a 3-D image onto said object.

19. The laser projector of claim 18 wherein said means for projecting a laser beam comprising:
   means for focusing said laser beam; and
   means for steering said laser beam to said object.

20. The laser projector of claim 19 wherein said means for projecting a laser beam further includes means for collimating said laser beam.

21. The laser projector of claim 19 wherein said means for steering said laser beam further includes galvanometer means for rapidly moving said laser beam.

22. The laser projector of claim 18 wherein said means for receiving a reflected portion of said laser beam further includes means for directing said reflected portion to a photo optic sensor.

23. The laser projector of claim 18 further comprising means for cooling said laser projector.

24. A laser projector system that projects and scans a laser beam onto a defined surface comprising:
   an optics enclosure comprising:
      a light emitting component capable of emitting a visible laser beam;
      a focusing module for focusing said laser beam at some distance from said optics enclosure;
      a two-axis beam steering component capable of rapidly directing said laser beam over the defined surface; and
      a photo optic feedback module that receives said laser light reflected from said defined surface;
   a controller power enclosure comprising:
      a controller module; and
      a power module for providing power to said controller module and said optics enclosure; and
   transmission means between said controller power enclosure and said optics enclosure including a timing module that converts an analog measure of the elapsed travel time of said laser beam from said light emitting component to said photoptic feedback module into a digital measure of the distance between said light emitting component and the defined surface.

* * * * *